(12) United States Patent
Owechko et al.

(10) Patent No.: US 7,715,591 B2
(45) Date of Patent: May 11, 2010

(54) HIGH-PERFORMANCE SENSOR FUSION ARCHITECTURE

(75) Inventors: Yuri Owechko, Newbury Park, CA (US); Narayan Srinivasa, Thousand Oaks, CA (US); Swarup Medasani, Thousand Oaks, CA (US); Riccardo Boscolo, Culver City, CA (US)

(73) Assignee: HRL Laboratories, LLC, Malibu, CA (US)

(*) Notice: Subject to any disclaimer, the term of this patent is extended or adjusted under 35 U.S.C. 154(b) by 1136 days.

(21) Appl. No.: 10/132,875

(22) Filed: Apr. 24, 2002

(65) Prior Publication Data
US 2003/0204384 A1  Oct. 30, 2003

(51) Int. Cl.
*G06K 9/00* (2006.01)
(52) U.S. Cl. ............... 382/104; 382/154; 382/199; 382/107
(58) Field of Classification Search ............. 382/154, 382/104
See application file for complete search history.

(56) References Cited

U.S. PATENT DOCUMENTS

| | | | | |
|---|---|---|---|---|
| 5,247,583 A | * | 9/1993 | Kato et al. | 382/164 |
| 5,309,522 A | * | 5/1994 | Dye | 382/154 |
| 5,561,431 A | * | 10/1996 | Peele et al. | 342/90 |
| 5,719,954 A | * | 2/1998 | Onda | 382/154 |
| 5,793,900 A | * | 8/1998 | Nourbakhsh et al. | 382/263 |
| 5,808,561 A | * | 9/1998 | Kinoshita et al. | 340/903 |
| 5,841,894 A | * | 11/1998 | Horie | 382/154 |
| 5,917,937 A | * | 6/1999 | Szeliski et al. | 382/154 |
| 5,983,147 A | * | 11/1999 | Krumm | 701/45 |
| 5,995,644 A | * | 11/1999 | Lai et al. | 382/131 |
| 6,026,340 A | * | 2/2000 | Corrado et al. | 701/47 |
| 6,078,253 A | * | 6/2000 | Fowler | 340/501 |
| 6,167,167 A | * | 12/2000 | Matsugu et al. | 382/283 |
| 6,295,373 B1 | | 9/2001 | Mahalanobis et al. | |
| 6,307,959 B1 | * | 10/2001 | Mandelbaum et al. | 382/154 |
| 6,314,211 B1 | * | 11/2001 | Kim et al. | 382/285 |
| 6,452,870 B1 | * | 9/2002 | Breed et al. | 367/99 |
| 6,529,809 B1 | * | 3/2003 | Breed et al. | 701/45 |

(Continued)

FOREIGN PATENT DOCUMENTS

WO    WO 02 30717 A    4/2002

OTHER PUBLICATIONS

Brand, Estelle, Gerritsen, Rob, Decision Trees, 1998, Miller Freeman, Inc., http://www.dbmsmag.com/9807m05.html.*

(Continued)

*Primary Examiner*—Sath V Perungavoor
(74) *Attorney, Agent, or Firm*—Tope-McKay & Assoc.

(57) ABSTRACT

A vision-based system for automatically detecting the type of object within a specified area, such as the type of occupant within a vehicle is presented. The type of occupant can then be used to determine whether an airbag deployment system should be enabled or not. The system extracts different features, including wavelet features and/or a disparity map from images captured by image sensors. These features are then processed by classification algorithms to produce class confidences for various occupant types. The occupant class confidences are fused and processed to determine occupant type. In a preferred embodiment, image features from image edges, wavelet features, and disparity are used. Various classification algorithms may be implemented to classify the object. Use of the disparity map and/or wavelet features provides greater computational efficiency.

144 Claims, 17 Drawing Sheets

U.S. PATENT DOCUMENTS

| | | | |
|---|---|---|---|
| 6,556,704 B1* | 4/2003 | Chen | 382/154 |
| 6,701,005 B1* | 3/2004 | Nichani | 382/154 |
| 6,754,379 B2* | 6/2004 | Xiong et al. | 382/154 |
| 6,801,662 B1* | 10/2004 | Owechko et al. | 382/224 |
| 6,914,599 B1* | 7/2005 | Rowe et al. | 345/420 |
| 6,961,443 B2* | 11/2005 | Mahbub | 382/100 |
| 7,289,662 B2* | 10/2007 | Keaton et al. | 382/154 |
| 7,505,841 B2* | 3/2009 | Sun et al. | 701/45 |
| 7,561,732 B1* | 7/2009 | Owechko et al. | 382/154 |
| 2001/0031068 A1* | 10/2001 | Ohta et al. | 382/103 |
| 2002/0001398 A1* | 1/2002 | Shimano et al. | 382/104 |
| 2002/0059022 A1* | 5/2002 | Breed et al. | 701/45 |
| 2002/0134151 A1* | 9/2002 | Naruoka et al. | 73/291 |
| 2002/0191837 A1* | 12/2002 | Takeda et al. | 382/154 |
| 2003/0091228 A1* | 5/2003 | Nagaoka et al. | 382/154 |
| 2003/0204384 A1* | 10/2003 | Owechko et al. | 703/1 |
| 2004/0022418 A1* | 2/2004 | Oota | 382/106 |
| 2004/0022437 A1* | 2/2004 | Beardsley | 382/199 |
| 2004/0105579 A1* | 6/2004 | Ishii et al. | 382/154 |
| 2004/0240754 A1* | 12/2004 | Smith et al. | 382/286 |
| 2004/0247158 A1* | 12/2004 | Kohler et al. | 382/104 |
| 2004/0252862 A1* | 12/2004 | Camus et al. | 382/104 |
| 2004/0252863 A1* | 12/2004 | Chang et al. | 382/104 |
| 2004/0252864 A1* | 12/2004 | Chang et al. | 382/104 |
| 2005/0196015 A1* | 9/2005 | Luo et al. | 382/103 |
| 2005/0196035 A1* | 9/2005 | Luo et al. | 382/159 |
| 2005/0201591 A1* | 9/2005 | Kiselewich | 382/104 |
| 2007/0055427 A1* | 3/2007 | Sun et al. | 701/45 |

OTHER PUBLICATIONS

Papageorgiou, C., Poggio, T., Trainable Pedestrain Detection, 1999, ISBN: 0-7803-5467-2.*

Rabiner, W., Jacquin, A., Object Tracking Using Motion-Adaptive Modeling of Scene Content, 1996, ISBN: 0-7803-3336-5.*

Feyrer, S., Zell, A., Detection, Tracking and Pursuit of Human with an Autonomous Mobile Robot, 1999, ISBN: 0-7803-5184-3.*

Krumm, J., Kirk, G., Video Occupant Detection for Airbag Deployment, 1998, ISBN: 0-8186-8606-5.*

Mengko, T., Adiono, T., Handoko, S., Setiadarma, R., Design and Implementation of Object Detection and Classification System Based on Deformable Template Algorithm, 1998, ISBN: 0-7803-5146-0.*

Lambert, G., Bock, F., Wavelet Methods for Texture Defect Detection, 1997, ISBN: 0-8186-8183-7.*

Sebe, N., Lew, M., Maximum Likelihood Stereo Matching, 2000, ISBN: 0-7695-0750-6.*

Papageorgiou, C., Oren, M., Poggio, T., A General Framework for Object Detection, 1998, ISBN: 81-7319-221-9.*

Gautama, S., Lacroix, S., Devy, M., Evaluation of stereo matching algorithms for occupant detection, 1999, Recognition, Analysis, and Tracking of Faces and Gestures in Real-Time Systems, 1999. Proceedings. International Workshop on.*

Pavlidis, I., Morellas, V., Papanikolopoulos, N., A vehicle occupant counting system based on near-infrared phenomenology and fuzzy neural dassification, 2000, Intelligent Transportation Systems, IEEE Transactions on.*

Haritaoglu, I., Flickner, M., Detection and tracking of shopping groups in stores, 2001, ISBN: 0-7695-1272-0.*

Klomark, M., "Occupant Detection using Computer Vision", LiTH-ISY-EX-3026, May 2000, http://www.cvl.isy.liu.se/ScOut/Masters/PaperInfo/klomark2000.html.*

Konrad, J., Lan, Z.D., "Dense Disparity Estimation from Feature Correspondences", Proceedings of SPIE—vol. 3957 Stereoscopic Displays and Virtual Reality Systems VII, John O. Merritt, Stephen A. Benton, Andrew J. Woods, Mark T. Bolas, Editors, May 2000, pp. 90-101.*

Papageorgiou, C., Poggio, T., Trainable Pedestrain Detection, 1999, ISBN: 0-7803-5467-2.*

Mengko, T., Adiono, T., Handoko, S., Setiadarma, R., Design and Implementation of Object Detection and Classification System Based on Deformable Template Algorithm, 1998, ISBN: 0-7803-5146-0.*

Mirhosseini, A.R. Hong Yau Chen, C. Pham, T., "Human Face Recognition: a Minimal Evidence Approach", Computer Vision, 1998. Sixth International Conference on, Jan. 4-7, 1998, pp. 652-659.*

Belur V. Dasarathy, "Sensor Fusion Potential Exploitation—Innovative Architectures and Illustrative Applications", Proceedings of the IEEE, vol. 85, No. 1, January 1997.*

J.L Barron, D.J. Fleet, and S.S. Beauchemin, "Performance of Optical Flow Techniques," International Journal of Computer Vision, vol. 12. No. 1. pp. 43-77, 1994.

D.W. Paglicroni, "Distance Transform: Properties and Machine Vision Applications," Computer Vision, Graphics and Image Processing, vol. 27. pp. 526-535, 1992.

Krishapuram R. and Lee J., "Fuzzy-Set-Based Hierarchical Networks for Information Fusion in Computer Vision," Neural Networks 5, 335-350, 1992.

Dempster, A.P., Laird, N. M., and Rubin, "Maximum Likelihood form incomplete data via the EM algorithm," Journal of Royal Statistical Society B, 39(2), 1-38. 1977.

D.P. Huttenlocher, G. Klanderman, and W. Rucklidge, "Comparing Images Using the Hausdorf Distance," IEEE Transactions on Pattern Analysis and Machine Intelligence, vol. 15, No. 9. pp. 850-863, Sep. 1993.

Quinlan, J.R., "Decision trees and decision-making," IEEE Trans. On Systems, Man and Cybernetics 20, 2 339-346, 1990.

Mao, J., and Jain, A.K., "Artificial Neural Networks for Feature Extraction and Multivariate Data Projections." IEEE Transactions on Neural Networks, vol. 6, No. 2, Mar. 1995.

Dyckhoff H. and Pedryea, W., "Generalized means as a model of compensation connectives," Cytometry. 14, 627-639.

Izquierdo, E., et al., "Nonlinear Gaussian filtering approach for object segmentation," IEE Proceedings: Vision, Image and Signal Processing, Institution of Electrical Engineers, GB, vol. 146. No. 3, Jun. 23, 1999, pp. 137-143, XP006013796.

Devy, M., et al., "Detection and Classification of Passenger Seat Occupancy using stereovision." Intelligent Vehicles Symposium. 2000. Proceedings of the IEEE Dearborn, MI, USA Oct. 3-5, 2000. Piscataway, NJ, USA, IEEE, US, Oct. 3, 2000, pp. 714-719, XP010529022.

Miller, J.T., et al., "Segmentation of Object Surfaces Using the Haar Wavelet as Multiple Resolutions," Proceedings of the International Conference on Image Processing (ICIP) Austin, Nov. 13-16. 1994, Los Alamitos, vol. 3, conf. I. pp. 475-477, XP010146337.

Office Action #1, dated Aug. 15, 2006, for U.S. Appl. No. 11/051,592 with references.

Office Action #2, dated Feb. 27, 2007, for U.S. Appl. No. 11/051,592 with references.

Office Action #3, dated Aug. 1, 2007, for U.S. Appl. No. 11/051,592 with references.

Office Action #4, dated May 20, 2008, for U.S. Appl. No. 11/051,592 with references.

* cited by examiner

FIG. 9

| 24 | n/a | 20 |
|----|-----|-----|
| 25 | ?   | n/a |
| 28 | 24  | n/a |

FIG. 11

HIGH-PERFORMANCE SENSOR FUSION ARCHITECTURE

BACKGROUND OF THE INVENTION (1) Technical Field

The present invention relates to techniques for fusing sensor data for object classification. More specifically, the present invention relates to the control of vehicle systems, such as air bag deployment systems, based on the classification of vehicle occupants.

(2) Discussion

Virtually all modern passenger vehicles have air bag deployment systems. The earliest versions of air bag deployment systems provided only front seat driver-side air bag deployment, but later versions included front seat passenger-side deployment. Current deployment systems provide side air bag deployment. Future air bag deployment systems will also include protection for passengers in rear seats. Today's air bag deployment systems are generally triggered whenever there is a significant vehicle impact, and will activate even if the area to be protected is unoccupied or is occupied by someone unlikely to be protected by the air bag.

While thousands of lives have been saved by air bags, a number of people have been injured and a few have been killed by the deploying air bag. Many of these injuries and deaths have been caused by the vehicle occupant being too close to the air bag when it deploys. Children and small adults have been particularly susceptible to injuries from air bags. Also, an infant in a rear-facing infant seat placed on the right front passenger seat is in serious danger of injury if the passenger airbag deploys. The United States Government has recognized this danger and has mandated that car companies provide their customers with the ability to disable the passenger side air bag. Of course, when the air bag is disabled, passengers, including full size adults, are provided with no air bag protection on the passenger side.

Therefore, a need exists for detecting the presence of a vehicle occupant within an area protected by an air bag. Additionally, if an occupant is present, the nature of the occupant must be determined so that air bag deployment can be fashioned so as to eliminate or minimize injury to the occupant.

Various mechanisms have been disclosed for occupant sensing. Breed et al. in U.S. Pat. No. 5,845,000, issued Dec. 1, 1998, describe a system to identify, locate, and monitor occupants in the passenger compartment of a motor vehicle. The system uses electromagnetic sensors to detect and image vehicle occupants. Breed et al. suggest that a trainable pattern recognition technology be used to process the image data to classify the occupants of a vehicle and make decisions as to the deployment of air bags. Breed et al. describe training the pattern recognition system with over one thousand experiments before the system is sufficiently trained to recognize various vehicle occupant states. The system also appears to rely solely upon recognition of static patterns. Such a system, even after training, may be subject to the confusions that can occur between certain occupant types and positions because the richness of the occupant representation is limited. It may produce ambiguous results, for example, when the occupant moves his hand toward the instrument panel.

A sensor fusion approach for vehicle occupancy is disclosed by Corrado, et al. in U.S. Pat. No. 6,026,340, issued Feb. 15, 2000. In Corrado, data from various sensors is combined in a microprocessor to produce a vehicle occupancy state output. Corrado discloses an embodiment where passive thermal signature data and active acoustic distance data are combined and processed to determine various vehicle occupancy states and to determine whether an air bag should be deployed. The system disclosed by Corrado detects and processes motion data as part of its sensor processing, thus providing additional data upon which air bag deployment decisions can be based. However, Corrado discloses multiple sensors to capture the entire passenger volume for the collection of vehicle occupancy data, increasing the complexity and decreasing the reliability of the system. Also, the resolution of the sensors at infrared and ultrasonic frequencies is limited, which increases the possibility that the system may incorrectly detect an occupancy state or require additional time to make an air bag deployment decision.

Accordingly, there exists a need in the art for a fast and reliable system for detection and recognizing occupants in vehicles for use in conjunction with vehicle air bag deployment systems. There is also a need for a system that can meet the aforementioned requirements with a sensor system that is a cost-effective component of the vehicle.

SUMMARY OF THE INVENTION

In one embodiment of the present invention, an apparatus for object detection is presented. The apparatus comprises a computer system including a processor, a memory coupled with the processor, an input for receiving images coupled with the processor, and an output for outputting information based on an object estimation coupled with the processor. The computer system further comprises means, residing in its processor and memory, for receiving images of an area occupied by at least one object; extracting image features including wavelet features from the images; classifying the image features to produce object class confidence data; and performing data fusion on the object class confidence data to produce a detected object estimate.

In another embodiment, the means for classifying image features comprises a means for processing the image features with at least one classification algorithm, which may be selected from the group consisting of a trained C5 decision tree, a trained Nonlinear Discriminant Analysis network, and a trained Fuzzy Aggregation Network.

In a further embodiment of the present invention, the means for extracting image features comprises a means for extracting wavelet coefficients of the at least one object in the images. Further, the means for classifying the image features comprises processing the wavelet coefficients with at least one classification algorithm to produce object class confidence data.

In another embodiment, the object comprises a vehicle occupant and the area comprises a vehicle occupancy area, and the apparatus further comprises a means for processing the detected object estimate to provide signals to vehicle systems, such as signals that comprise airbag enable and disable signals.

In a still further embodiment, the apparatus comprises a means for capturing images from a sensor selected from a group consisting of CMOS vision sensors and CCD vision sensors.

In yet another embodiment, the means for extracting image features further comprises means for detecting edges of the at least one object within the images; masking the edges with a background mask to find important edges; calculating edge pixels from the important edges; and producing edge density maps from the important edges, the edge density map providing the image features, and wherein the means for classifying the image features processes the edge density map with at least one classification algorithm to produce object class confidence data.

In a yet further embodiment, the means for extracting image features further comprises means for receiving a stereoscopic pair of images of an area occupied by at least one object; detecting pattern regions and non-pattern regions within each of the pair of images using a texture filter; generating an initial estimate of spatial disparities between the pattern regions within each of the pair of images; using the initial estimate to generate a subsequent estimate of the spatial disparities between the non-pattern regions based on the spatial disparities between the pattern regions using disparity (order and smoothness) constraints; iteratively using the subsequent estimate as the initial estimate in the means for using the initial estimate to generate a subsequent estimate in order to generate further subsequent estimates of the spatial disparities between the non-pattern regions based on the spatial disparities between the pattern regions using the disparity constraints until there is no change between the results of subsequent iterations, thereby generating a final estimate of the spatial disparities; and generating a disparity map of the area occupied by at least one object from the final estimate of the spatial disparities, and wherein the means for classifying the image features processes the disparity map with at least one of the classification algorithms to produce object class confidence data.

In still another embodiment, the apparatus further comprises means for detecting motion of the at least one object within the images; calculating motion pixels from the motion; and producing motion density maps from the motion pixels, the motion density map providing the image features; and the means for classifying the image features processes the motion density map with at least one of the classification algorithms to produce object class confidence data, which is used independently of the data fusion to produce an independent detected object estimate.

The features of the above embodiments may be combined in many ways to produce a great variety of specific embodiments, as will be appreciated by those skilled in the art. Furthermore, the means which comprise the apparatus are analogous to the means present in computer program product embodiments and to the steps in the method embodiment.

BRIEF DESCRIPTION OF THE DRAWINGS

The objects, features and advantages of the present invention will be apparent from the following detailed descriptions of the preferred embodiment of the invention in conjunction with reference to the following drawings.

FIG. 9 depicts a neighborhood density map created during the disparity estimation step, whose entries specify the number of points in an 8-connected neighborhood where a disparity estimate is available;

FIG. 11 depicts an example of a 3×3 neighborhood where the disparity of the central element has to be estimated;

DETAILED DESCRIPTION OF PREFERRED EMBODIMENTS

Figure 1:
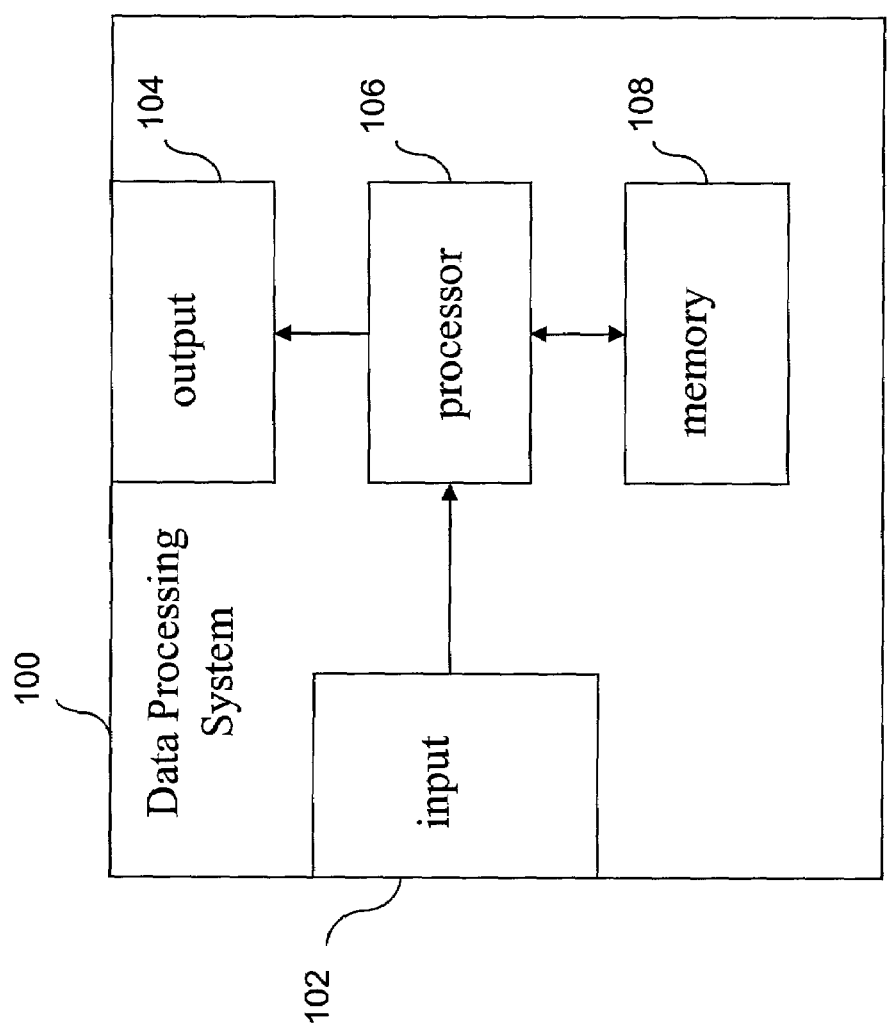
FIG. 1 is a block diagram depicting the components of a computer system used in the present invention.

The present invention relates to techniques for fusing sensor data for object classification. More specifically, the present invention relates to the control of vehicle systems, such as air bag deployment systems, based on the classification of vehicle occupants. The following description, taken in conjunction with the referenced drawings, is presented to enable one of ordinary skill in the art to make and use the invention and to incorporate it in the context of particular applications. Various modifications, as well as a variety of uses in different applications, will be readily apparent to those skilled in the art, and the general principles defined herein, may be applied to a wide range of embodiments. Thus, the present invention is not intended to be limited to the embodiments presented, but is to be accorded the widest scope consistent with the principles and novel features disclosed herein. Furthermore it should be noted that unless explicitly stated otherwise, the figures included herein are illustrated diagrammatically and without any specific scale, as they are provided as qualitative illustrations of the concept of the present invention.

In order to provide a working frame of reference, first a glossary of terms used in the description and claims is given as a central resource for the reader. Next, a discussion of various physical embodiments of the present invention is provided. Finally, a discussion is provided to give an understanding of the specific details.

(1) Glossary

Before describing the specific details of the present invention, a centralized location is provided in which various terms used herein and in the claims are defined. The glossary provided is intended to provide the reader with a feel for the intended meaning of the terms, but is not intended to convey the entire scope of each term. Rather, the glossary is intended to supplement the rest of the specification in more accurately explaining the terms used.

Means—The term "means" as used with respect to this invention generally indicates a set of operations to be performed on a computer, and may represent pieces of a whole program or individual, separable, software modules. Non-limiting examples of "means" include computer program code (source or object code) and "hard-coded" electronics (i.e. computer operations coded into a computer chip). The "means" may be stored in the memory of a computer or on a computer readable medium.

Object: The term object as used herein is generally intended to indicate a physical object for which classification is desired.

Sensor: The term sensor as used herein generally includes a detection device, preferably an imaging sensor, and more preferably optical sensors such as CCD cameras. Non-limiting examples of other sensors that may be used include radar and ultrasonic sensors.

(2) Physical Embodiments

The present invention has three principal "physical" embodiments. The first is a system for determining operator distraction, typically in the form of a computer system operating software or in the form of a "hard-coded" instruction set. This system may be incorporated into various, devices such as a vehicular warning system, and may be coupled with a variety of sensors that provide information regarding an operator's distraction level. The second physical embodiment is a method, typically in the form of software, operated using a data processing system (computer). The third principal physical embodiment is a computer program product. The computer program product generally represents computer readable code stored on a computer readable medium such as an optical storage device, e.g., a compact disc (CD) or digital versatile disc (DVD), or a magnetic storage device such as a floppy disk or magnetic tape. Other, non-limiting examples of computer readable media include hard disks, read only memory (ROM), and flash-type memories. These embodiments will be described in more detail below.

A block diagram depicting the components of a computer system used in the present invention is provided in FIG. 1. The data processing system 100 comprises an input 102 for receiving information from at least one sensor for use in classifying objects in an area. Note that the input 102 may include multiple "ports". Typically, input is received from sensors embedded in the area surrounding an operator such as CMOS and CCD vision sensors. The output 104 is connected with the processor for providing information regarding the object(s) to other systems in order to augment their actions to take into account the nature of the object (e.g., to vary the response of an airbag deployment system based on the type of occupant). Output may also be provided to other devices or other programs, e.g. to other software modules, for use therein. The input 102 and the output 104 are both coupled with a processor 106, which may be a general-purpose computer processor or a specialized processor designed specifically for use with the present invention. The processor 106 is coupled with a memory 108 to permit storage of data and software to be manipulated by commands to the processor.

Figure 2:
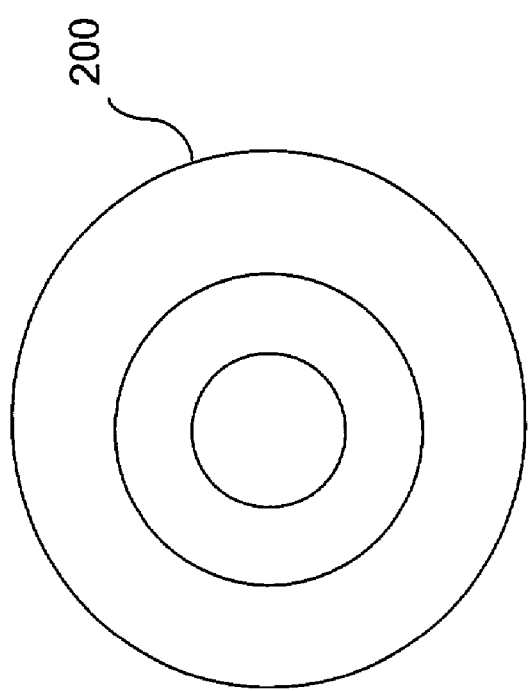
FIG. 2 is an illustrative diagram of a computer program product embodying the present invention.

An illustrative diagram of a computer program product embodying the present invention is depicted in FIG. 2. The computer program product 200 is depicted as an optical disk such as a CD or DVD. However, as mentioned previously, the computer program product generally represents computer readable code stored on any compatible computer readable medium.

(3) Introduction

Figure 3:
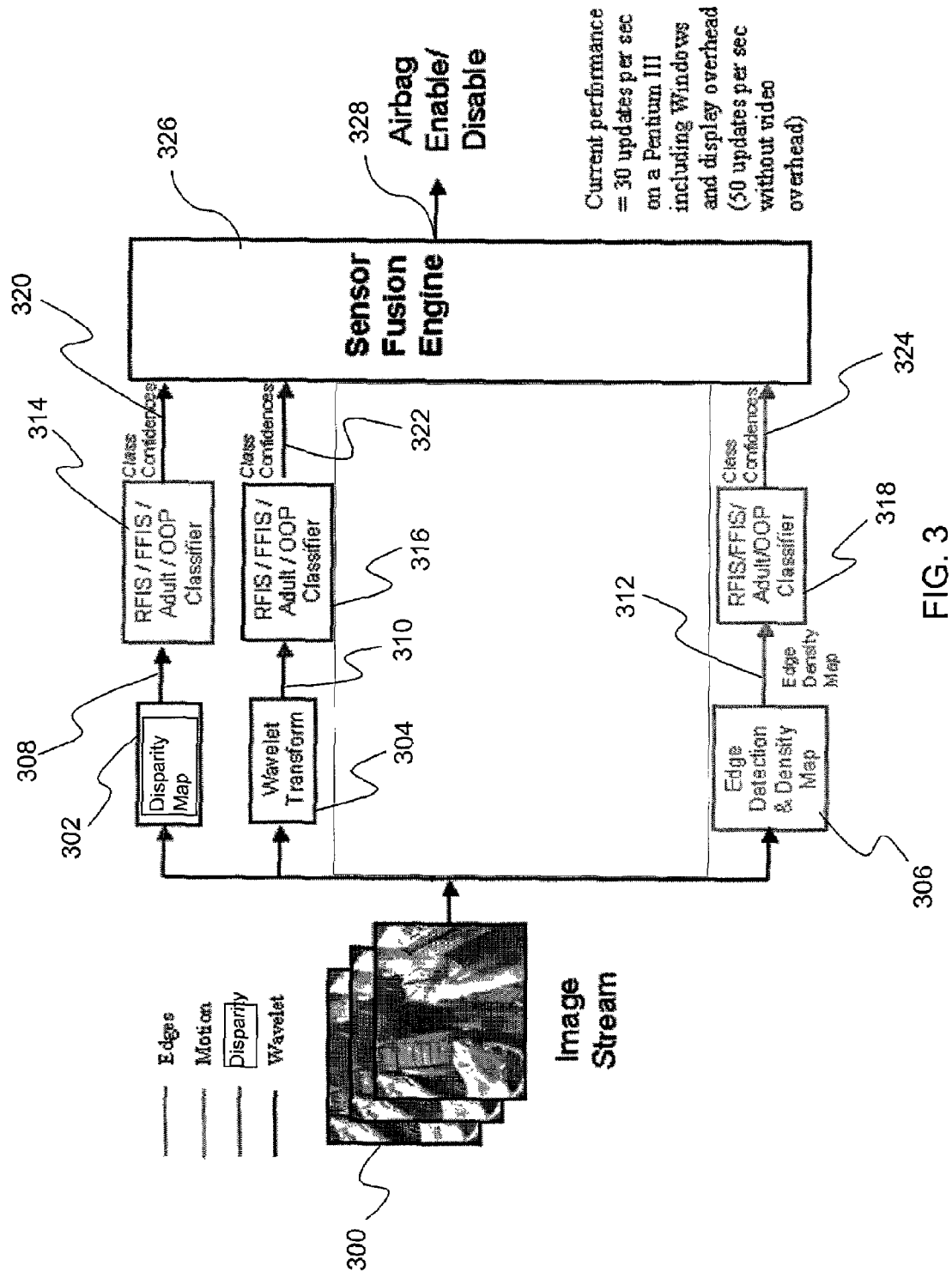
FIG. 3 is a block diagram for the preferred embodiment of the object detection and tracking system provided by the present invention.

A block diagram of a preferred embodiment of the object detection and tracking system provided by the present invention is shown in FIG. 3. In general, the present invention extracts different types of information or "features" from the stream of images 300 generated by one or more vision sensors. It is important to note, however, that although vision sensors such as CCD and CMOS cameras are preferred, other sensors such as radar and ultrasonic sensors may be used. Feature extraction modules 302, 304, and 306 receive and process frames from the stream of images 300 to provide feature data 308, 310, and 312. Classifier modules 314, 316, and 318 are provided for each feature type which classifies the occupant into one of a small number of classes, such as adult in normal position or rear-facing infant seat. Each classifier generates a class prediction and confidence value 320, 322, and 324. The predictions and confidences of the classifiers are then combined in a sensor fusion engine 326 which makes the final decision to enable or disable the airbag, represented by an enable/disable signal 328. Because the sensor fusion engine combines the "votes" of the classifiers operating separately on edge, scale, and disparity information in an optimized manner, the final decision accuracy is higher than can be achieved using any of the individual features and classifiers.

Use of vision sensors in a preferred embodiment of the present invention permits an image stream 300 from a single set of sensors to be processed in various ways by a variety of feature extraction modules in order to extract many different features therefrom. For reasons of low cost, flexibility, compactness, ruggedness, and performance the preferred imaging sensor is a CCD or CMOS imaging chip. CMOS vision chips, in particular, have many advantages for this application and are being widely developed for other applications. A wide variety of CMOS and CCD vision sensors may be used in the preferred embodiment. The FUGA Model 15$d$ from Fill Factory Image Sensors and Mitsubishi's CMOS Imaging Sensor chip are two examples of imaging sensor chips that may be used in the preferred embodiment of the present invention. The FUGA chip provides a logarithmic response that is particularly useful in the present invention. The LARS II CMOS vision sensor from Silicon Vision may also be used, especially since it provides pixel-by-pixel adaptive dynamic range capability. The vision sensors are preferably used in conjunction with an active illumination system in order to ensure that the area of occupancy is adequately illuminated independently of ambient lighting conditions.

As shown in FIG. 3, the feature extraction modules produce different types of features utilized in the preferred embodiment. A Disparity Map module 302 produces disparity data 308 obtained by using two vision sensors in a triangulation mode. A Wavelet Transform module 304 provides scale data 310 in the form of wavelet coefficients. An Edge Detection and Density Map module 306 produces an edge density map 312. These modules 302, 305, and 306 can be implemented by separate hardware processing modules executing the software required to implement the specific functions, or a single hardware processing unit can be used to execute the software required for all these functions. Application specific integrated circuits (ASICs) may also be used to implement the required processing.

Next, the feature data 308, 310, and 312 are provided to classifier modules and tracking modules 314, 316, and 318. In the preferred embodiment as shown in FIG. 3, three classifier modules are used. All three of the classifier modules produce classification values for rear-facing infant seat (RFIS), front-facing infant seat (FFIS), adult in normal or twisted position, adult out-of-position (OOP), and empty; classifier 314 processing the disparity data 308 from the Disparity Map module 302; classifier 316 processing the scale data 310 from the Wavelet Transform module 304; and classifier 318 processing the edge density map data 312 from the Edge Detection and Density Map module 306; respectively. All of the classifiers have low computational complexity and have high update rates. The details of the feature extraction modules, their associated classifiers, and the sensor fusion engine are described below.

In the preferred embodiment of the present invention, one or more vision sensors are positioned on or around the rear-view mirror, or on an overhead console. Positioning the vision sensors in these areas allows positions of both the driver and front seat passenger or passengers to be viewed. Additional vision sensors may be used to view passengers in other areas of the car such as rear seats or to particularly focus on a specific passenger area or compartment. The vision sensors are fitted with appropriate optical lens known in the art to direct the appropriate portions of the viewed scene onto the sensor.

Figure 4:
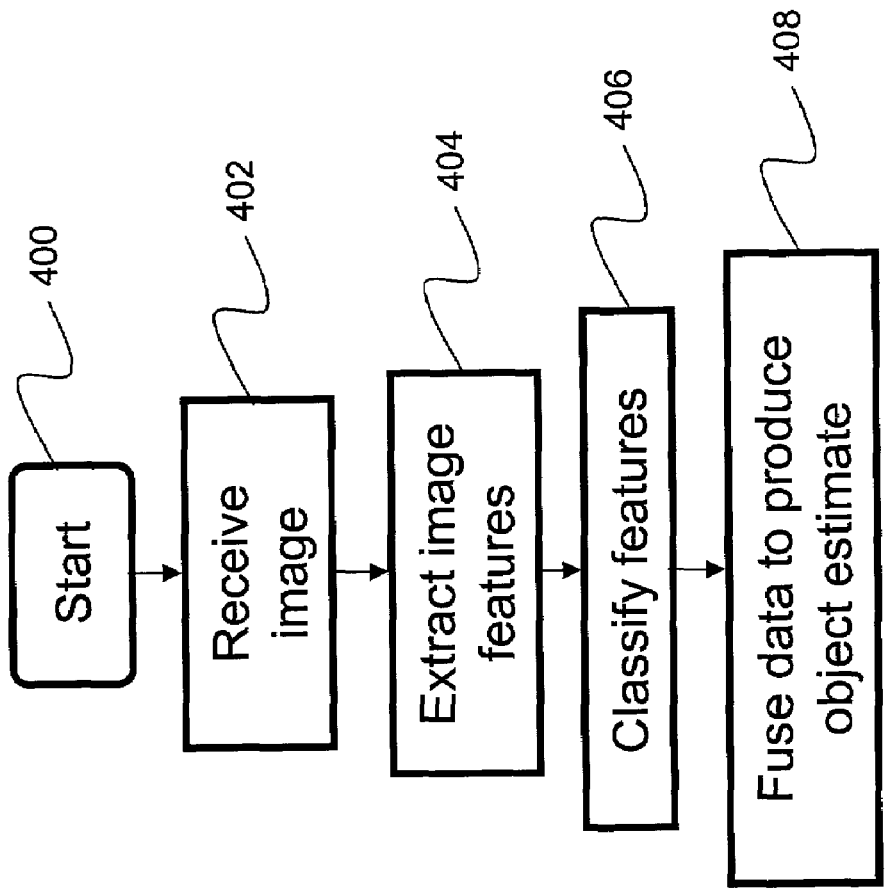
FIG. 4 is a block diagram depicting the general steps involved in the operation of the present invention.

A flow chart depicting the general steps involved in the method of the present invention is shown in FIG. 4. After the start of the method 400, a step of receiving images 402 is performed in which a series of images is input into hardware operating the present invention. Next, various features, including features such as those derived from a disparity map, a wavelet transform, and via edge detection and density are extracted 404. Once the features have been extracted, the features are classified 406 and the resulting classifications are then fused to produce an object estimate 408. These steps may also be interpreted as means or modules of the apparatus of the present invention, and are discussed in more detail below.

(4) Wavelet Transform

In an occupant sensing system for automotive applications one of the key events is represented by a change in the seat occupant. A reliable system to detect such occurrence will thus provide some additional amount of information to be exploited to establish the occupant type. If it is known with some degree of accuracy, in fact, that no major changes have occurred in the observed scene, such information can be provided to the system classification algorithm as an additional parameter. This knowledge can then be used, for example, to decide whether a more detailed analysis of the scene is required (in the case where a variation has been detected) or, on the contrary, some sort of stability in the occupant characteristics has been reached (in the opposite case) and minor variations should be just related to noise. The Wavelet Transform module 304 implements the processing necessary to detect an occupant change event.

The wavelet-based approach used in the Wavelet Transformation module 304 is capable of learning a set of relevant features for a class based on an example set of images. The relevant features may be used to train a classifier that can accurately predict the class of an object. To account for high spatial resolution and to efficiently capture global structure, an over-complete/redundant wavelet basis is preferred.

In a preferred embodiment, an over-complete dictionary of Haar wavelets are used that respond to local intensity differences at several orientations and scales. A set of labeled training data from the various occupant classes is used to learn an implicit model for each of the classes. The occupant images used for training are transformed from image space to wavelet space and are then used to train a classifier. For a given image, the wavelet transform computes the response of the wavelet filters over the image. Each of three oriented wavelets—vertical, horizontal, and diagonal, are computed at different scales—preferably 64×64 and 32×32. The multi-scale approach allows the system to represent coarse as well as fine scale features. The over-complete representation corresponds to a redundant basis wavelet representation and provides better spatial resolution. This is accomplished by shifting wavelet templates by ¼ the size of the template instead of shifting the size of the template. The absolute value of the wavelet coefficients is preferably used, thus eliminating the differences in features when considering situations involving a dark object on a white background and vice-versa.

The speed advantage resulting from the wavelet transform may be appreciated by a practical example where 192×192 sized images were extracted from a camera image and down sampled to generate 96×96 images. Two wavelets of size 64×64 and 32×32 were then used to obtain a 180-dimensional vector that included vertical and horizontal coefficients at the two scales. The time required to operate the wavelet transform classifier, including the time required for extracting the wavelet features by the Wavelet Transform module 304, was about 20 ms on an Intel Pentium III processor operating at 800 Mhz, and optimized using SIMD and MMX instructions.

(5) Edge Detection and Density Map

In the preferred embodiment of the present invention, the Edge Detection and Density Map module 306 provides data to the Edge Classifier module 318, which then calculates class confidences based on image edges. Edges have the important property of being relatively insusceptible to illumination changes. Furthermore, with the advent of CMOS sensors, edge features can be computed readily by the sensor itself. A novel and simple approach is used to derive occupant features from the edge map.

Figure 5:
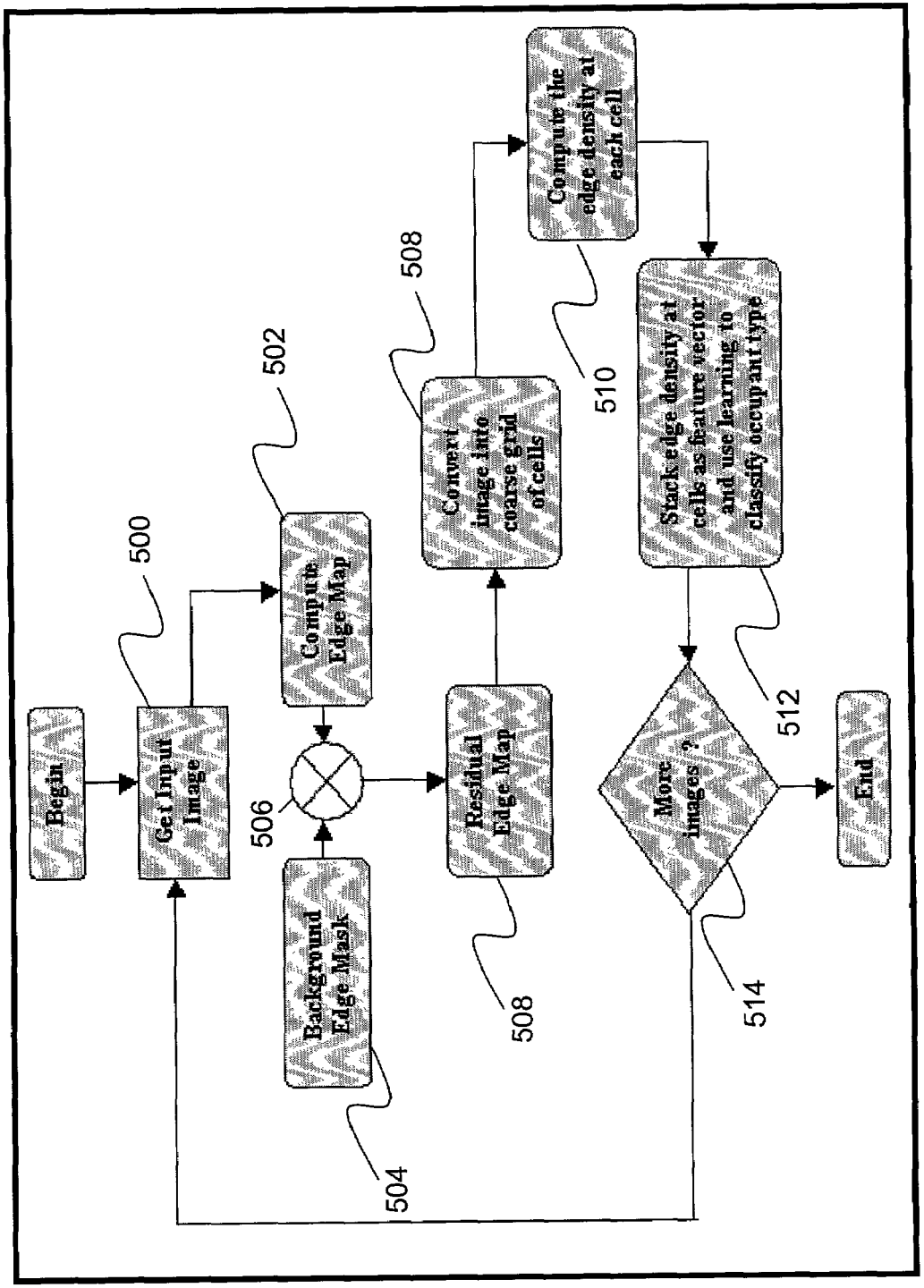
FIG. 5 is a flowchart depicting the steps required to derive occupant features from image edges.

The flowchart shown in FIG. 5 shows the steps required to derive occupant features from image edges. Block 500 represents the acquisition of a new input image. Block 502 represents the computation of an edge map for this image. As indicated above, CMOS sensors known in the art can provide this edge map as part of their detection of an image.

Figure 6:
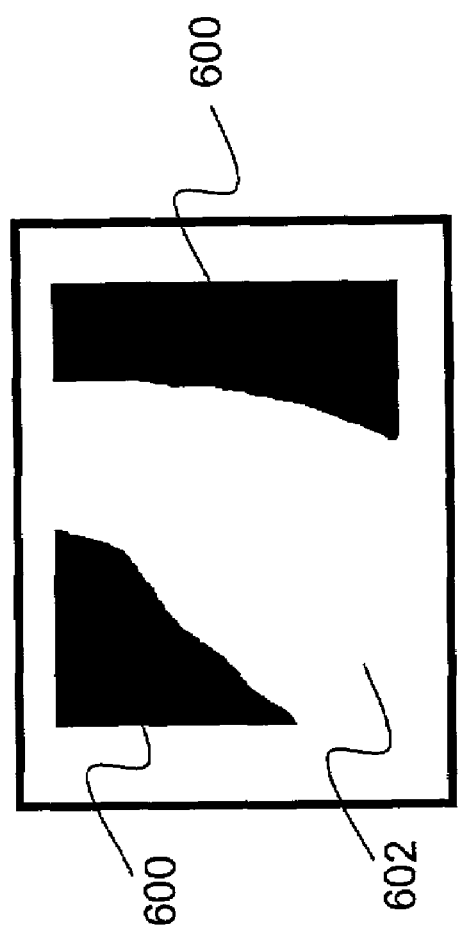
FIG. 6 depicts a representative mask image for the front passenger side seat.

Block 504 represents the creation of a background mask image. This mask image is created to identify pixels in the image that are important. FIG. 6 shows a representative mask image for the front passenger side seat. In FIG. 6, the unimportant edges are marked by areas 600 shown in black while the important edges are marked by areas 602 shown in white.

Operation 506 represents the masking of the edge map with the mask image to identify the important edge pixels from the input image. Block 508 represents the creation of the residual edge map. The residual edge map is obtained by subtracting unimportant edges (i.e., edges that appear in areas where there is little or no activity as far as the occupant is concerned).

Figure 7:
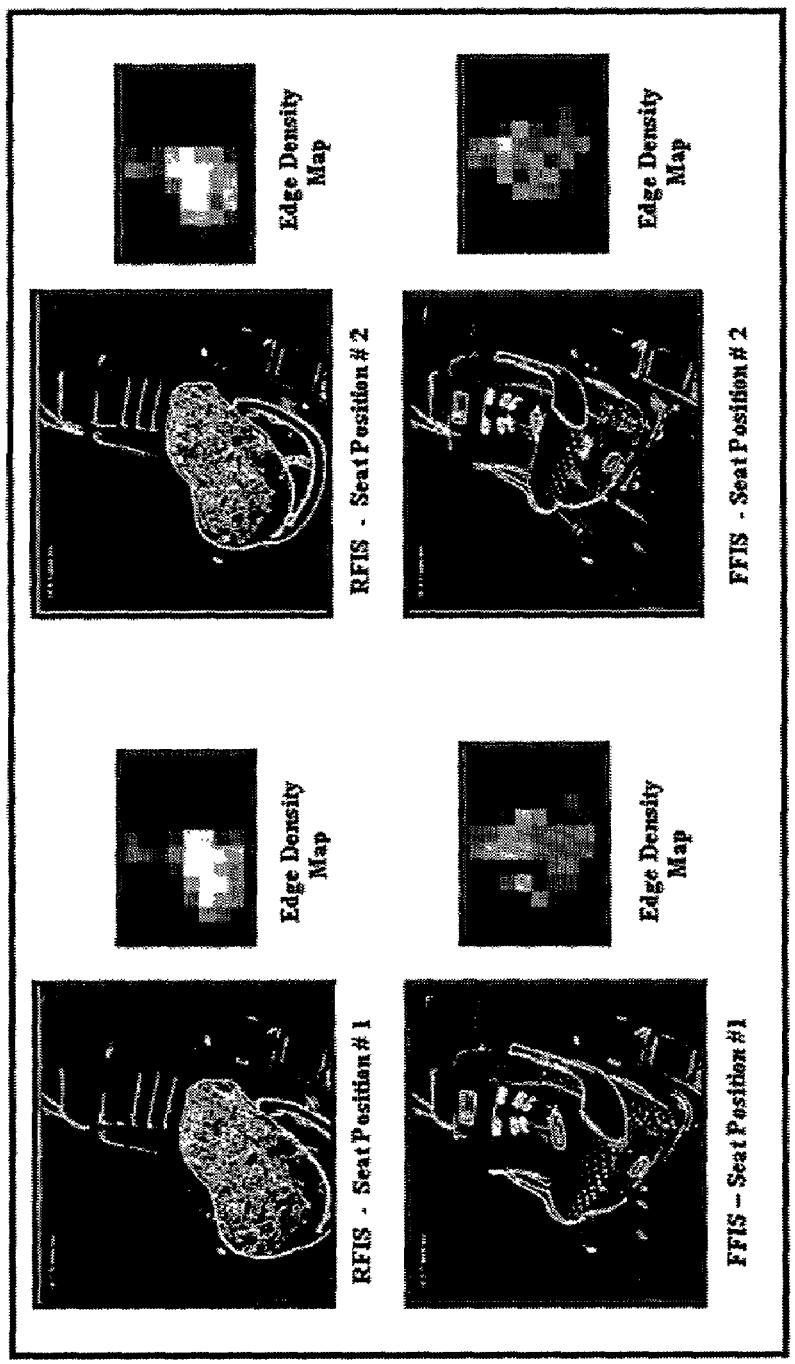
FIG. 7 depicts a few examples of the resulting edge density map for different occupants and car seat positions.

The residual edge map can then be used to determine specific image features. Block 508 represents the conversion of the residual image map into a coarse cell array. Block 510 represents the computation of the density of edges in each of the cells in the coarse array using the full resolution residual edge map. The edge density in coarse pixel array is then normalized based on the area covered by the edges in the residual edge map by the coarse pixel. A few examples of the resulting edge density map are shown in FIG. 7 for different occupants and car seat positions. Notice that the edge density map for RFIS (rear-facing infant seat) at two different car seat positions are more similar in comparison to the edge density maps for the FFIS (front-facing infant seat) at the same car seat positions.

Block 512 represents the extraction of features (e.g., 96 for a 12×8 array) from the coarse pixel array. The edge densities of each cell in the edge density map are stacked as features. The features are provided by a feature vector formed from the normalized strength of edge density in each cell of the coarse cell array. The feature vector is then used by a classification algorithm (such as the C5, NDA and FAN algorithms discussed below) to classify the occupant into RFIS, FFIS, Adult in normal position or Adult out-of-position. Block 514 represents the iteration of the algorithm for additional images according to the update rate in use.

In the preferred embodiment of the present invention, the C5 decision tree method is used as the classification algorithm. Decision tree methods are well known in the art. These methods, such as C5, its predecessor C4.5 and others, generate decision rules which separate the feature vectors into classes. The rules are of the form IF F1<T1 AND F2>T2 AND . . . THEN CLASS=RFIS, where the F's are feature values and T's are threshold values. The rules are extracted from a binary decision tree which is formed by selecting a test which divides the input set into two subsets where each subset contains a larger proportion of a particular class than the predecessor set. Tests are then selected for each subset in an inductive manner, which results in the binary decision tree. Each decision tree algorithm uses a different approach to selecting the tests. C5, for example, uses entropy and information gain to select a test. Eventually each subset will contain only members of a particular class, at which point the subset forms the termination or leaf of that branch of the tree. The tests are selected so as to maximize the probability that each leaf will contain as many cases as possible. This will both reduce the size of the tree and maximize the generalization power. The tests used with the edge detection features are discussed further below.

(6) Disparity Map (a) Introduction and System Description

Figure 8:
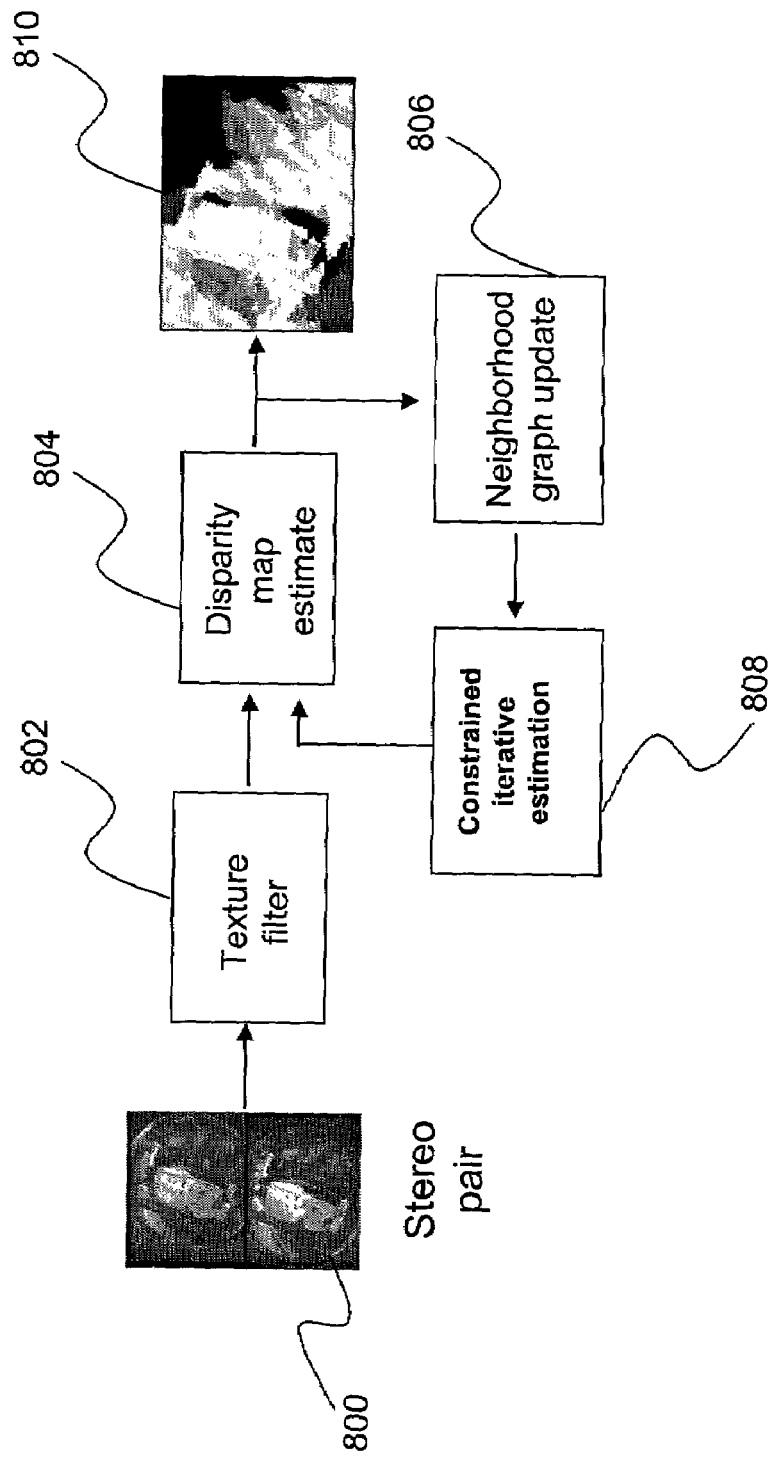
FIG. 8 is a block diagram depicting the components (steps) of the disparity map module.

The disparity estimation procedure used in the Disparity Map module 302 is based on image disparity. The procedure used by the present invention provides a very fast time-response, and is preferably configured to compute a dense disparity map (more than 300 points) on an arbitrary grid at a rate of 50 frames per second. The components of the Disparity Map module 302 are depicted in FIG. 8. A stereo pair of images 800 is received from a stereo camera, and is provided as input to a texture filter 802. The task of the texture filter 802 is to identify those regions of the images characterized by the presence of recognizable features, and which are thus suitable for estimating disparities. An initial disparity map is estimated from the output of the texture filter 802 by a disparity map estimator 804. Once the disparity of the points belonging to this initial set has been estimated, the computation of the disparity values for the remaining points is carried on iteratively as a constrained estimation problem. In order to do so, first a neighborhood graph update is performed 806, and a constrained iterative estimation 808 is performed. In this process, denser neighborhoods are examined first and the disparity values of adjacent points are used to bound the search interval. Using this approach, smooth disparity maps are guaranteed and large errors due to matching of poorly textured regions are highly reduced. As this iterative process progresses, a disparity map 810 is generated, and can be used for object classification. In simpler terms, the Disparity Map Module 302 receives two images from different locations. Based on the differences in the images a disparity map is generated, representing a coarse estimate of the surface variations or patterns present in area of the images. The surface variations or patterns are then classified in order to determine a likely type of object to which they belong. Note that if the range to one pixel is known, the disparity map can also be used to generate a coarse range map. More detail regarding the operation of the Disparity Map Module 302 is provided below.

Several choices are available for the selection of a texture filter 802 for recognizing regions of the image characterized by salient features, and the present invention may use any of them as suited for a particular embodiment. In a preferred embodiment, a simple texture filter 802 was used for estimating the mean variance of the rows of a selected region of interest. This choice reflects the necessity of identifying those image blocks that present a large enough contrast along the direction of the disparity search. For a particular NxM region of the image, the following quantity:

$$\sigma^2 = \frac{1}{M(N-1)} \sum_{y=0}^{M-1} \sum_{x=0}^{N-1} \left( I(x,y) - \frac{1}{N} \sum_{x=0}^{N-1} I(x,y) \right)^2 \quad (1)$$

is compared against a threshold defining the minimum variance considered sufficient to identify a salient image feature. Once the whole image has been filtered and the regions rich in texture have been identified, the disparity values of the selected regions are estimated minimizing the following cost function in order to perform the matching between the left and right image:

$$d^{(opt)} = \min_d \sum_{y=0}^{M-1} \sum_{x=0}^{N-1} \left| I_{left}(x+d, y) - I_{right}(x, y) \right|. \quad (2)$$

Figure 9:
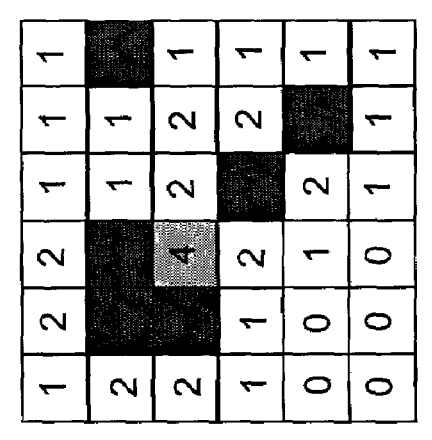

During the disparity estimation step, a neighborhood density map is created. This structure consists of a matrix of the same size as the disparity map, whose entries specify the number of points in an 8-connected neighborhood where a disparity estimate is available. An example of such a structure is depicted in FIG. 9.

Figure 10:
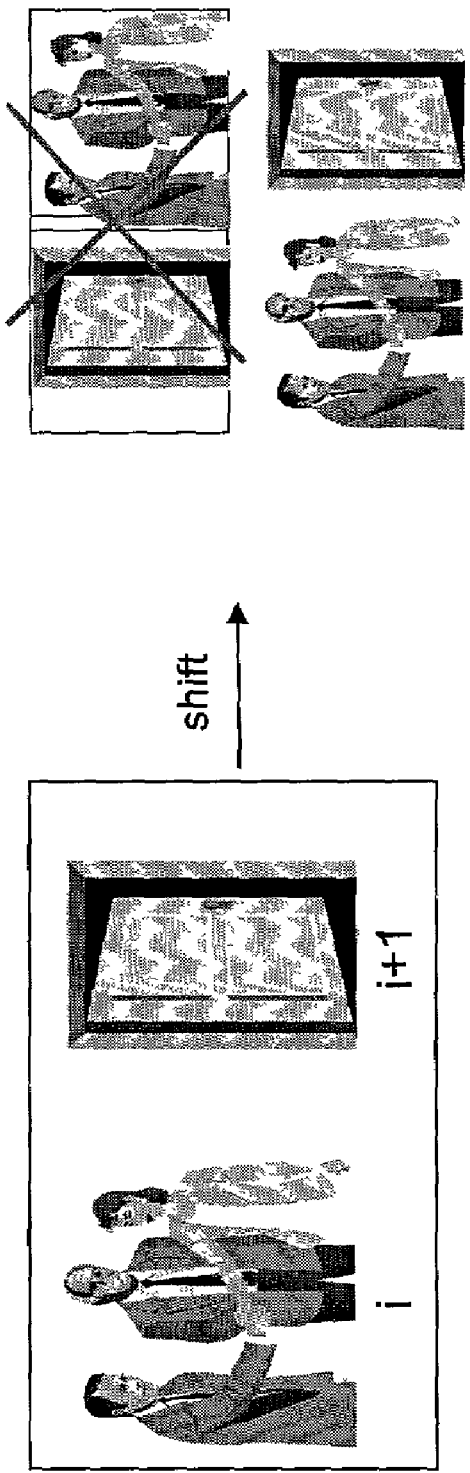
FIG. 10 depicts an example of allowed and prohibited orders of appearance of image elements.

Once the initialization stage is completed, the disparity information available is propagated starting from the denser neighborhoods. Two types of constraints are enforced during the disparity propagation. The first type of constraint ensures that the order of appearance of a set of image features along the x direction is preserved. This condition, even though it is not always satisfied, is generally true in most situations where the camera's base distance is sufficiently small. An example of allowed and prohibited orders of appearance of image elements is depicted in FIG. 10. This consistency requirement translates in the following set of hard constraints on the minimum and maximum value of the disparity in a given block i:

$$d_{min}^{(i)} = d^{(i-1)} - \varepsilon \text{ and} \quad (3)$$

$$d_{max}^{(i)} = d^{(i+1)} + \varepsilon, \text{ where} \quad (4)$$

$$d_{max}^{(i)} = d^{(i+1)} + \varepsilon$$

$$\varepsilon = |x_i - x_{i-1}|.$$

This type of constraint is very useful for avoiding false matches of regions with similar features.

Figure 11:
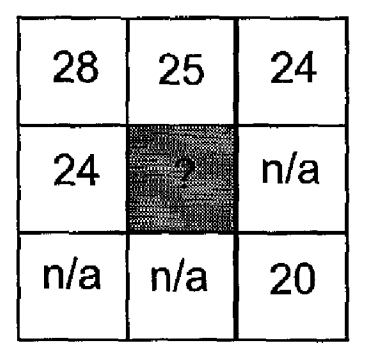

The local smoothness of the disparity map is enforced by the second type of propagation constraint. An example of a 3×3 neighborhood where the disparity of the central element has to be estimated is shown in FIG. 11. In this example, the local smoothness constraints are:

$d_{min} = \min\{d \in N_{ij}\} - \eta$ and $d_{max} = \max\{d \in N_{ij}\} + \eta$, where $N_{ij} = \{p_{m,n}\}$, $m = i-1, \ldots, i+1$, and $n = j-1, \ldots, j+1$.

The concept is that very large local fluctuations of the disparity estimates are more often due to matching errors that to true sharp variations. As a consequence, enforcing a certain degree of smoothness in the disparity map greatly improves the signal-to-noise ratio of the estimates. In a preferred embodiment, the parameter $\eta$ is forced equal to zero, thus bounding the search interval of possible disparities between the minimum and maximum disparity currently measured in the neighborhood.

Additional constraints to the disparity value propagation based on the local statistics of the grayscale image are enforced. This feature attempts to lower the amount of artifacts due to poor illumination conditions and poorly textured areas of the image, and addresses the issue of propagation of disparity values across object boundaries. In an effort to reduce the artifacts across the boundaries between highly textured objects and poorly textured objects, some local statistics of the regions of interest used to perform the disparity estimation are computed. This is done for the entire frame, during the initialization stage of the algorithm. The iterative propagation technique takes advantage of the computed statistics to enforce an additional constraint to the estimation process. The results obtained by applying the algorithm to several sample images have produced a net improvement in the disparity map quality in the proximity of object boundaries and a sharp reduction in the amount of artifacts present in the disparity map.

Because the disparity estimation is carried on in an iterative fashion, the mismatch value for a particular image block and a particular disparity value usually need to be evaluated several times. The brute force computation of such cost function every time its evaluation is required is computationally inefficient. For this reason, an ad-hoc caching technique is preferred in order to greatly reduce the system time-response and provide a considerable increase in the speed of the estimation process. The quantity that is stored in the cache is the mismatch measure for a given disparity value in a particular point of the disparity grid. In a series of simulations, the number of hits in the cache averaged over 80%, demonstrating the usefulness of the technique.

The last component of the Disparity Map module 302 is an automatic vertical calibration subroutine. This functionality is particularly useful for compensating for hardware calibration tolerances. While an undetected horizontal offset between the two cameras usually causes only limited errors in the disparity evaluation, the presence of even a small vertical offset can be catastrophic. The rapid performance degradation of the matching algorithm when such an offset is present is a very well-known problem that affects all stereo camera-based ranging systems.

A fully automated vertical calibration subroutine is based on the principle that the number of correctly matched image features during the initialization stage is maximized when there is no vertical offset between the left and right image. The algorithm is run during system initialization and after periodically to check for the consistency of the estimate.

(b) System Performance

Figure 12:
FIG. 12 depicts an example of a stereo image pair corresponding to the disparity map depicted in FIG. 13.
Figure 12:
Figure 13:
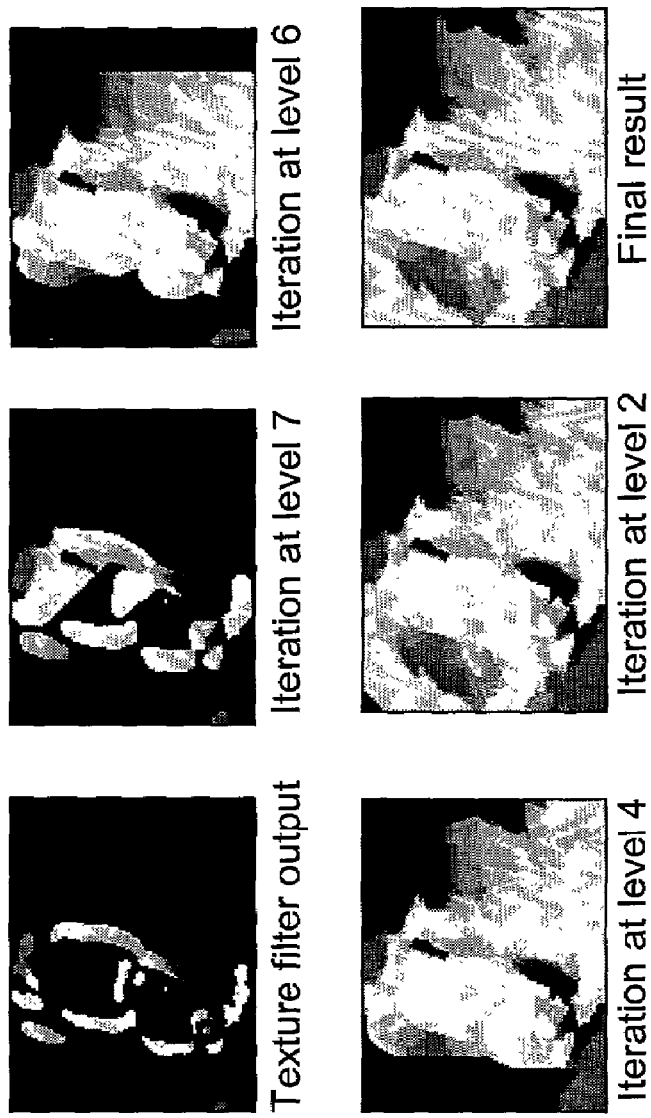
FIG. 13 depicts the disparity map corresponding to the stereo image pair shown in FIG. 12, with the disparity map computed at several iteration levels.
Figure 14:
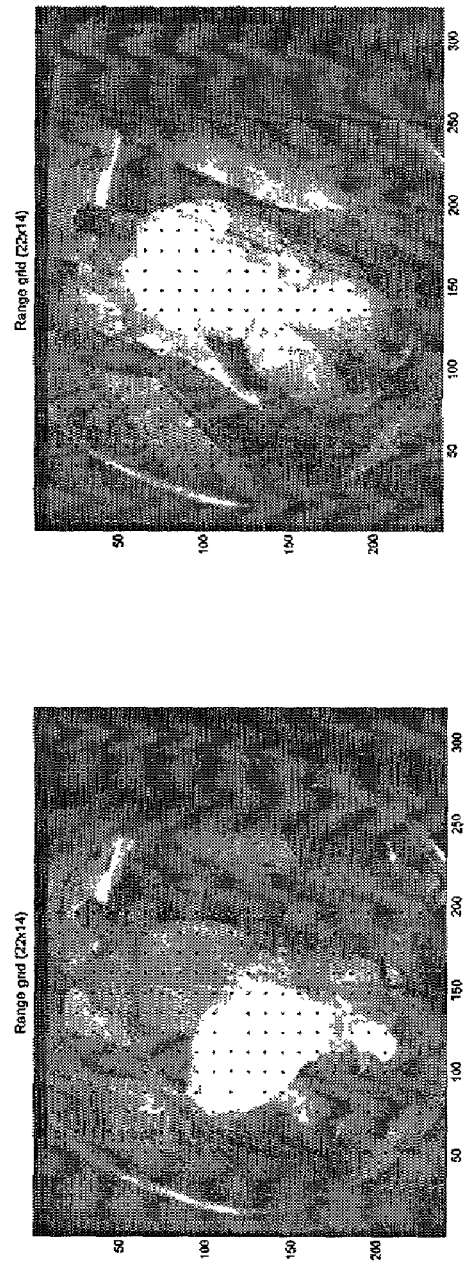
FIG. 14 is an illustrative example of an actual occupant with a disparity grid superimposed for facilitating an accurate selection of the points used to estimate the disparity profile.

An example of a stereo image pair is shown in FIG. 12, and its corresponding computed disparity map at several iteration levels is shown in FIG. 13. In order to maximize the classification performance of the system, the grid over which the disparity values are estimated is tailored around the region where the seat occupant is most likely to be present. An example of an actual occupant with the disparity grid superimposed is depicted in FIG. 14. An accurate selection of the points used to estimate the disparity profile, in fact, resulted in highly improved sensitivity and specificity of the system.

Figure 15:
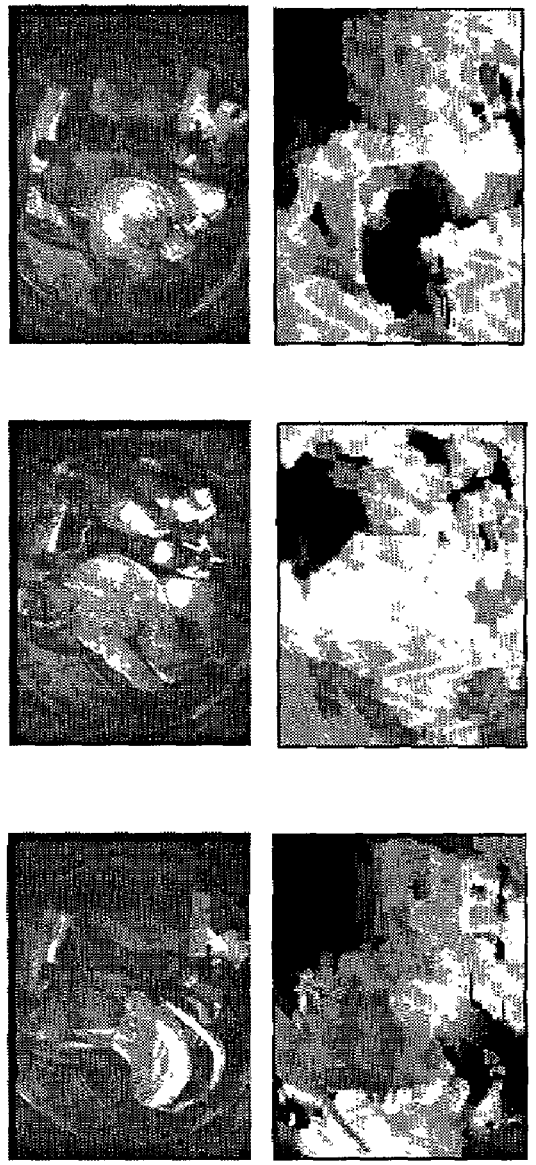
FIG. 15 depicts several examples of disparity maps obtained for different types of occupants.

Using a database of about 5,000 images, the accuracy of the disparity-only classification was close to 90% for a 50/50 structured split of the available examples, and close to 99% for a random split. The technique proved to be capable of providing consistent disparity estimates across different illumination conditions, also thanks to the fill-in of shadows and dark regions provided by the artificial illumination. Several examples of disparity maps obtained for different types of occupants are depicted in FIG. 15.

(7) Sensor Fusion

Each of the three classification modules, the Disparity Map Classifier 314, the Wavelet Transform Classifier 316, and the Edge Detection and Density Map classifier 318, produce class confidences for specified occupant types. The class confidences produced by each individual module could be used to produce an estimate of the presence of a particular type of occupant or to produce an occupant-related decision, such as airbag enable or disable. However, overall performance of the system is improved by aggregating and evaluating the class confidence values produced by the individual modules. Processing such aggregated data is known in the art as sensor or data fusion.

Sensor fusion as provided by the present invention operates by effectively fusing the class confidence values obtained from the three modules, namely the Disparity Map Classifier 314, the Wavelet Transform Classifier 316, and the Edge Detection and Density Map classifier 318, to generate an airbag enable/disable decision. As previously discussed, in the exemplary embodiment of the present invention, the Template Matching module provides three outputs, the first two correspond to outputs of the RFIS template matching scores and the last corresponds to the FFIS template matching score. The Edge Detection and Density classifier module 318 preferably uses C5 decision rules to generate class confidences for RFIS, OOP, ADULT_NT and FFIS. Preferably, the combined 11-dimensional input vector is then fed as input to a Fuzzy Aggregation Network (FAN). The FAN than fuses the information by aggregating the class confidences and propagating the aggregate through a hierarchical network to produce an estimate of a particular occupant type or to generate a system control decision, such as a final airbag enable/disable decision.

Fuzzy aggregation networks (FANs) have been widely employed to fuse information from multiple modalities. A FAN generates degrees of satisfaction of different criteria and aggregates the memberships in a hierarchical network. The nature and parameters of the connectives at each node are learned through a simple back-propagation learning procedure. Aggregation networks also provide a mechanism for selecting important features and discarding irrelevant or superfluous ones. Fuzzy aggregation networks differ from multi-layer perceptrons in many ways. The main difference is that the activation function used at each node is not the usual sigmoid function, but instead one of the many fuzzy set connectives. Fuzzy set aggregation connectives are employed for integrating membership functions corresponding to the input features. Although several attractive fuzzy set connectives exist, the exemplary embodiment of the present invention uses the Generalized Mean (GM) operator for fusing the information at each node.

The GM operator g ( ) is defined as given below:

$$g(x_1, x_2, \ldots, x_n) = \left( \sum_{i=1}^{n} w_i x_i^p \right)^{1/p},$$

where $x_i$ are the input values and $w_i$ are the corresponding weights. In the above equation, p determines the behavior of the Generalized Mean operator. The mean value always increases with an increase in p. All values between a minimum and a maximum can be obtained by varying the value of p between $-\infty$ and $+\infty$. Thus, in the extreme case, the GM operator can be used as union or intersection. Also, it can be shown that p=−1 gives the harmonic mean, p=0 gives the geometric mean, and p=+1 gives the arithmetic mean. The use of the GM operator at the nodes permits the partitioning of data in the input space using super-quadrics instead of the usual hyper-planes used with multi-layer perceptrons.

Figure 16:
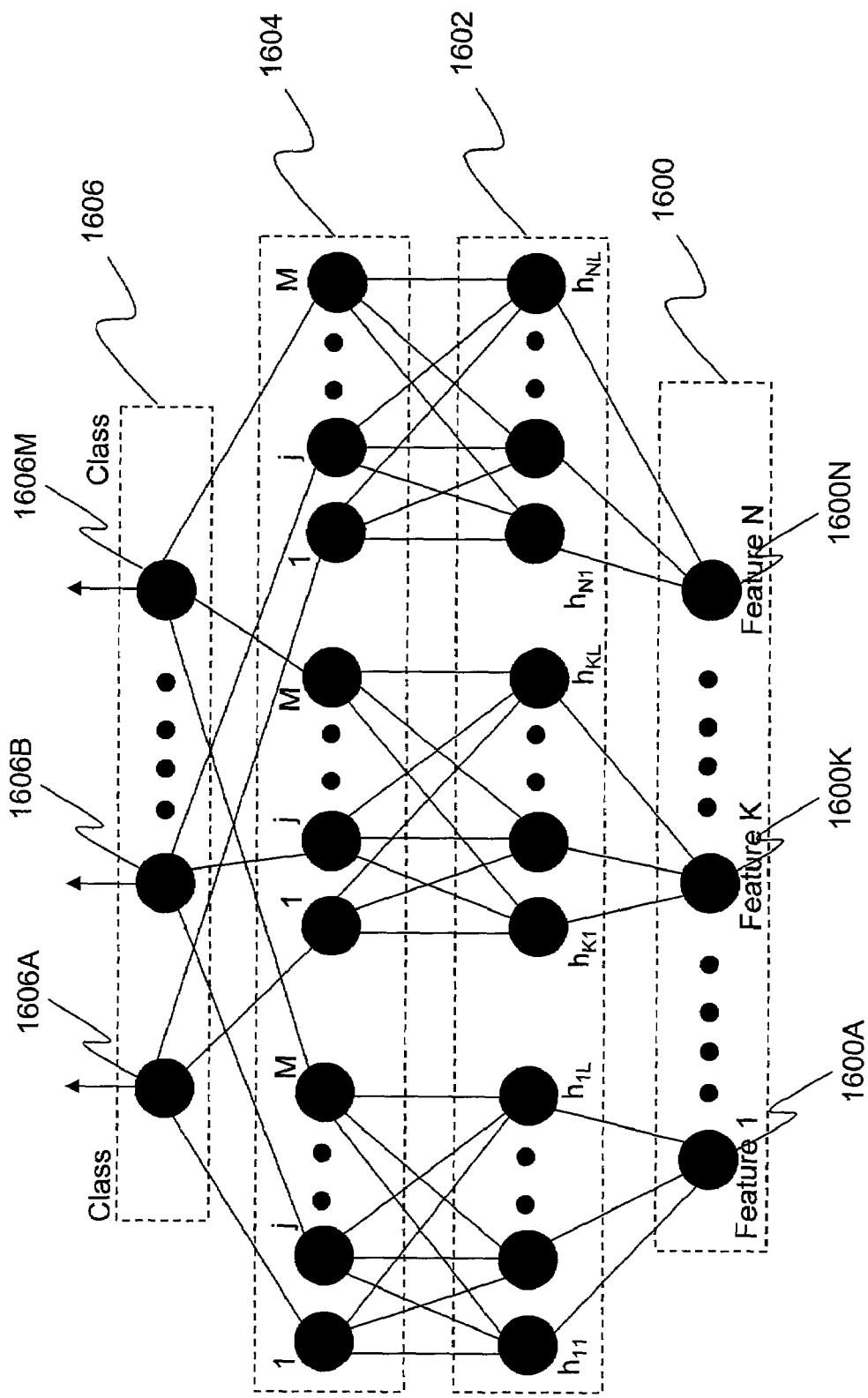
FIG. 16 depicts the network architecture of a fuzzy aggregation network.

The architecture of a typical FAN is shown in FIG. 16. The FAN as used in the sensor fusion engine of the exemplary embodiment of the present invention engine has four layers. The first layer is the input feature layer 1600. The second layer is the linguistic quantization layer 1602. In this layer, each of the features is transformed into a fuzzy linguistic term. This linguistic quantization of the input space assists in generating an intuitive interpretation to the trained network. The third layer is the linguistic fusion layer 1604. This layer tries to determine optimal ways to fuse the linguistic quantizations corresponding to each feature. The output layer 1606 tries to optimally learn different ways of combining the different features. The input layer nodes 1600A . . . 1600N equal the number of input features d, the output layer nodes 1606A . . . 1606M depend on the number of classes c. The number of units in the linguistic quantization layer 1602 depends on the granularity or quantization of each feature. The third layer or linguistic fusion layer 1604 consists of cd nodes.

An important issue is the linguistic quantization step. This step involves partitioning each feature so that it can be interpreted linguistically, e.g., RFIS is High, or ADULT_OOP is Low, etc. Such a linguistic partitioning can be achieved by using fuzzy membership functions. In the exemplary embodiment of the present invention, the membership functions were generated using an Expectation Maximization (EM) algorithm. For each feature, an optimal number of Gaussian memberships were estimated using the EM algorithm. These Gaussian memberships were then ranked so that they correspond to linguistic terms Low, Medium, or High. Note that the output of the second layer nodes indicates the degree to which the input features satisfy these linguistic terms. Note also that the membership functions can be generated by other techniques known in the art.

At each node in the network, the GM operator is used to aggregate evidence presented to the node. Thus, at each node both p and $w_i$ are to be learned. The overall network structure is learned from the data by minimizing the sum of squared errors given below.

$$E = \sum_{k=1}^{N} (f_k - y_k)^2$$

In the equation above, $f_k$ is the aggregation function and $x_{1k}, \ldots x_{nk}$ are the inputs in the equation shown below:

$$f_k = \left( \frac{w_1^2}{\sum w_i^2} x_1^p + \ldots + \frac{w_n^2}{\sum w_i^2} x_n^p \right)^{1/p}$$

The network structure and parameters can be learned through the use of the back propagation techniques known in the art. With this technique, the update equations for the node weights $w_i$ and parameter p are given by:

$$w_i^{new} = w_i^{old} - 2\eta \sum_{k=1}^{N} (f_k - y_k) \frac{\partial f_k}{\partial w_i}, i = 1, \ldots, n$$

$$p^{new} = p^{old} - 2\beta \sum_{k=1}^{N} (f_k - y_k) \frac{\partial f_k}{\partial p}$$

Where η and b are suitable learning rate constants. The choice of η and b determines the speed and reliability of convergence. The partial derivatives of $f_k$ with respect to $w_i$ and p are given in the following equations:

$$\frac{\partial f_k}{\partial p} = \frac{f_k^{1-p}}{p^2} \left( \sum_{i=1}^{n} \frac{w_i^2}{\sum w_i^2} x_{ik}^p \ln x_{ik}^p - f_k^p \ln f_k^p \right)$$

$$\frac{\partial f_k}{\partial w_i} = \frac{2w_i}{p \sum w_i^2} f_k^{1-p} (x_{ik}^p - f_k^p)$$

The equations for the node weights w and parameter p are iterated until convergence, that is, until there is no change in w and p. After convergence, it has been observed that some nodes tend to have zero weights. This implies that the features that are being input to the nodes are either redundant or superfluous and can be eliminated from the final decision making process.

(8) Classification Algorithms

In this section, a non-limiting set of classification algorithms that may be used for classification of the extracted feature data sets and in the sensor fusion engine 326 are discussed.

a. Nonlinear Discriminant Analysis (NDA)

The NDA algorithm is based on the well-known back-propagation algorithm. It consists of an input layer, two hidden layers, and an output layer. The second hidden layer is deliberately constrained to have either two or three hidden nodes with the goal of visualizing the decision making capacity of the neural network. The two (or three) hidden layer nodes of the second hidden layer can be viewed as latent variables of a two (or three) dimensional space which are obtained by performing a nonlinear transformation (or projection) of the input space onto the latent variable space. In reduction to practice, it has been observed that the second hidden layer did not enhance the accuracy of the results. Thus, in some cases, it may be desirable to resort to a single hidden layer network. While this modification removes the ability to visualize the network, it may still be interpreted by expressing it as a set of equivalent fuzzy If-Then rules. Furthermore, use of a single hidden layer network offers the advantage of reduced computational cost. The network architecture used in this case was fixed at one hidden layer with 25 nodes. There were five output nodes (RFIS, FFIS, Adult_nt, OOP, and Empty). The network was trained on each of the three data types using a training set and was then tested using a validation data set. For the enable/disable case (where FFIS, Adult in normal position constitute enable scenarios and the rest of the classifications constitute disable scenarios), the NDA performed at around 90% for the edge density, 91.2% for the Wavelet, and 93% for the disparity features. Most of the confusion with regard to the edge density was predominantly between RFIS/OOP, OOP/Adult_nt, and FFIS/Adult_nt cases. For the Wavelet features, the confusions improved for all three pairs. The disparity features offered the best separation between the various classes, and, hence, were the best in resolving these confusions as evident from the system's enable/disable accuracy. The total number of fuzzy rules was 25 (i.e. equal to the number of nodes in the first hidden layer).

b. M-Probart

The M-PROBART (the Modified Probability Adaptive Resonance Theory) neural network algorithm is a variant of the Fuzzy ARTMAP. This algorithm was developed to overcome the deficiency in Fuzzy ARTMAP of on-line approximation of nonlinear functions under noisy conditions. When used in conjunction with the present invention, a variant of the M-PROBART algorithm that is capable of learning with high accuracy but with a minimal number of rules is preferable.

The key difference between the NDA and the M-PROBART is that the latter offers the possibility of learning in an on-line fashion. In the reduction to practice of one embodiment, the M-PROBART was trained on the same dataset as the NDS. The M-PROBART was able to classify the prediction set with accuracy comparable to NDA. The network performed at 88.3% for the edge density (with 274 rules), 89.6% for the wavelet features (with 773 rules), and 93% for the disparity (with 280 rules). In contrast to the NDA, the M-PROBART required many more rules. In particular, for the set of wavelet features which contains roughly double the number of features as compared to edge density and disparity, the M-PROBART required a very large number of rules. The rule to accuracy ratio for NDA is therefore superior to the M-PROBART. However, if the training is to be performed in an on-line fashion, the M-PROBART is the only classifier among these that can do so.

c. C5 Decision Trees and Support Vector Machine

In reduction to practice of an embodiment of the present invention, C5 decision trees and support vector machine (SVM) algorithms have also been applied. While C5 provides adequate performance and can be efficiently implemented, both NDA and M-PROBART were found to offer superior performance. The SVM approach, however, is expected to be very promising, appearing to be slightly less than NDA in performance. However, SVM is also more difficult to use because it is formulated for the 2-class problem. The classifiers used with the embodiment of the present invention, as reduced to practice in this case, make 5-class decisions, which require the use of a system of 2-class SVM "experts" to implement 5-class classification. Similar modifications would be required for decisions involving over 2-class classifications.

(9) Reduction to Practice

An occupant detection system according to the present invention was demonstrated by collecting data from various occupant scenarios. The system used the Disparity Map Classifier 314, the Wavelet Transform Classifier 316, and the Edge Detection and Density Map classifier 318 as depicted in FIG. 3 in the first level and a fusion classifier as the Sensor Fusion Engine 326 to fuse the outputs of the individual classifiers (sub-classifiers). The sub-classifiers were trained to make 5-class decisions (RFIS, FFIS, Adult, OOP, or Empty) and the fusion classifier was trained to use the outputs of the sub-classifiers and make 2-class decisions (Enable or Disable an airbag). The system, including image acquisition and GUI overhead ran at 30 frames/second on an 800 Mhz Intel® Pentium III machine.

The first step in developing the system involved training the sub-classifiers. For this purpose, a data set of 3225 images was collected. The images included 4 RFIS, 4 FFIS, and 6 adults. An equal number of empty passenger seat images were also collected to train the classifiers to recognize the empty seat. The Edge Detection and Density Map classifier 318 was trained on 81-dimensional data using C5 and NDA classifiers. The Disparity Map classifier 314 and the Wavelet Transform classifier 316 were trained on 77-dimensional and 180-dimensional data, respectively. All three of the sub-classifiers (314, 315, and 316) were implemented using both C5 and NDA. The NDA sub-classifiers were chosen because of their better generalization performance. The classification rates of the Edge Detection and Density Map 318, the Disparity Map 314, and the Wavelet Transform 316 NDA sub-classifiers on a structured split were 93.6%, 95.1%, and 91.22%, respectively. Note that the final system classification rate is much higher (>98%) once the sub-classifier results are combined in the fusion layer.

Once the sub-classifiers were accurately trained, a new data set was collected to train the fusion classifier comprising the Sensor Fusion Engine 326. This classifier was also trained using C5 decision trees and NDA. The NDA fusion classifier was again preferred to maintain homogeneity and due to its better generalization capabilities. The fusion classifier was trained using the outputs of the Edge Detection and Density Map 318, the Disparity Map 314, and the Wavelet Transform 316 sub-classifiers. The input vector was 18-dimensional and the fusion classifier was trained for an Enable/Disable decision. The data collected for this step included 6510 patterns, which were extracted from images of 4 RFIS, 4 FFIS, and 5 adults. The 2-class NDA fusion classifier gave rise to a classification rate of 98.5% on a test data set that was obtained using a structured split on the data. The passenger seat position was fixed in both this data set and the data set used for training the sub-classifiers, and included such positions as rotated, inboard, outboard, hands on dashboard, and crossed legs. The data were collected with a sunroof in both open and closed positions.

The next step in reduction to practice of this particular example was validation. A third data set was collected for validating the trained system. The validation data included several situations that were not part of the data used to originally train the system. These additional situations included blankets covering the baby seats, adults leaning differently, adults holding boxes and maps, empty seats with objects, and baby seats with dummies. In addition, data were collected for different passenger seat positions. This validation data set contained 19,970 patterns. The outputs of the sub-classifiers and the fusion classifier were recorded for analysis. Images for every tenth frame (1997 images) were also recorded. This data set was then used to analyze the relative performance of the sub-classifiers in the occupant sensing system. The performances of the Disparity Map 314 and the Wavelet Transform 316 sub-classifiers were better than that of the Edge Detection and Density Map 318 sub-classifier. Also, validation performance was good (97%) for similar situations and passenger seat positions in both training and testing sets. Generalization performance was good for most new occupant situations in the validation set that were not in the training set.

Figure 17:
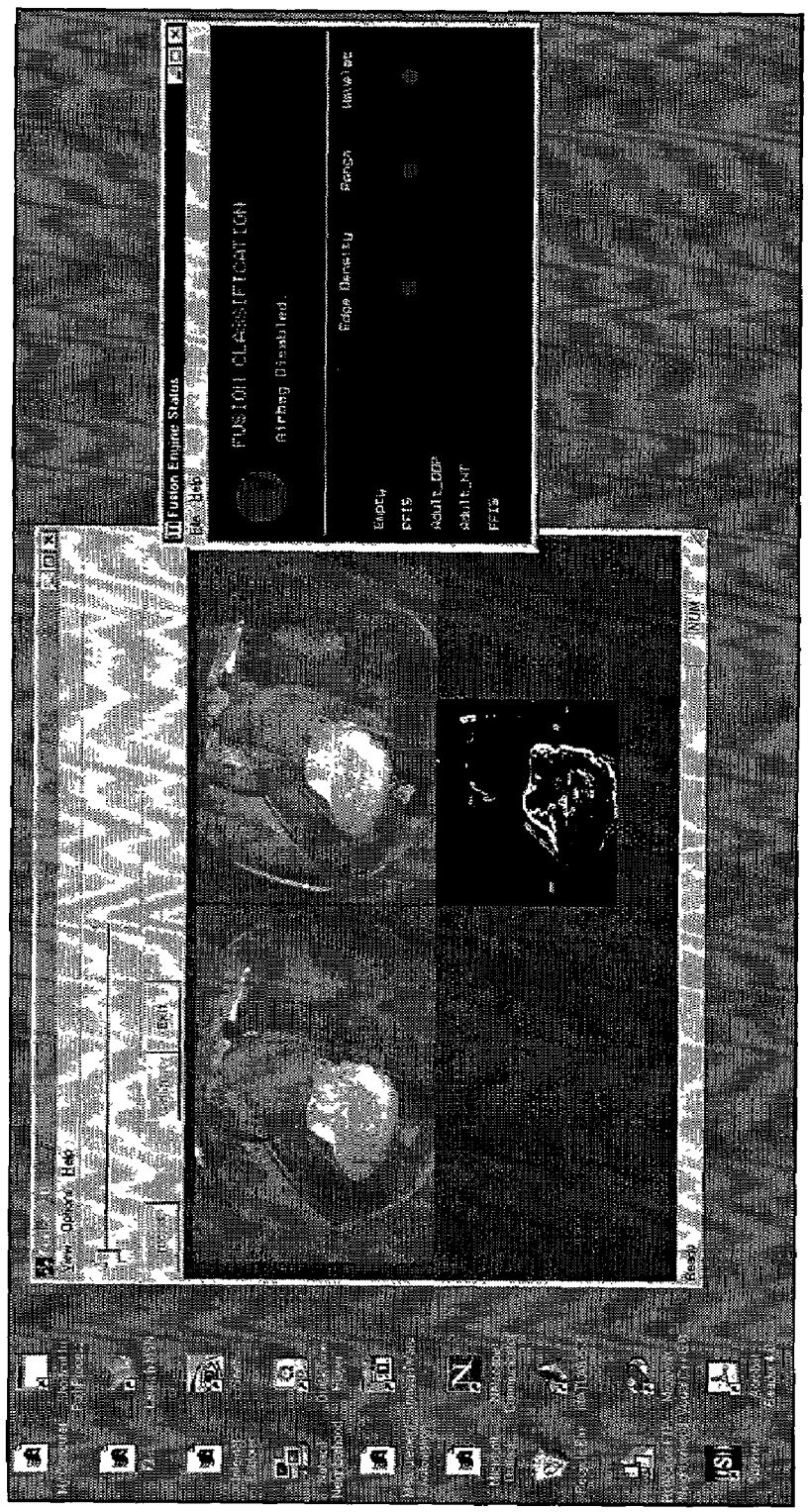
FIG. 17 is an example screen shot of a computer application developed according to the present invention, running in the Windows 98® environment.

Using the trained system, a software application was designed for using the collected images and extracting features and classifying objects. The application is used to clearly display the functionality of the individual sub-classifiers and the fusion classifier by running the GUI interface in real-time using the stored data. The GUI displays video frames from the test vehicle along with real-time classification results. An example screen shot of the application is depicted in FIG. 17 running in the Windows 98® environment, where the small window shows the outputs of each of the three sub-classifiers, which indicate whether the occupant is RFIS (rear-facing infant seat), Adult_OOP (adult out of position), Adult_NT (adult in normal or twisted position), or FFIS (front-facing infant seat). The final airbag enable or disable decision made by the sensor fusion engine on the basis of the outputs and confidence levels of the sub-classifiers is shown also. Although not apparent in the figure, dots are color coded to indicate whether a disable or an enable decision is made. The decision update rate is 20 updates per second, which includes display overhead. The rate increases to 50 updates per second if the video bottleneck to the computer is eliminated.

(10) Other Embodiments

Other embodiments of the present invention for use in vehicle occupant detection and tracking may be adapted to provide other classifications of vehicle occupants, such as small adult, small child, pet, etc. With the present invention, provision of additional classifications should have little impact on computation complexity and, therefore, update rates, since the classification processing is based upon rules determined by off-line training as described above. The additional classifications can then also be used to make an airbag deployment decision.

A preferred embodiment of the present invention has been discussed in terms of providing a deployment decision to an airbag deployment system, but the apparatus and method of the present invention may also be used to control other features in an airbag deployment system or used to control other systems within a vehicle. For example, alternative embodiments of the present invention may provide decisions as to the strength at which the airbags are to be deployed, or decisions as to which airbags within a vehicle are to be deployed. Also, embodiments of the present invention may provide decisions for controls over seat belt tightening, seat position, air flow from a vehicle temperature control system, etc.

Other embodiments of the present invention may also be applied to other broad application areas such as Surveillance and Event Modeling. In the surveillance area, the present invention provides detection and tracking of people/objects within sensitive/restricted areas (such as embassies, pilot cabins of airplanes, driver cabins of trucks, trains, parking lots, etc.), where one or more cameras provide images of the area under surveillance. In such an embodiment, the classification modules would be trained to detect humans (may feasibly be trained even to detect particular individuals) within the viewing area of one or more cameras using the information extracted by the modules. The classification decisions from these modules can then be fused using the FAN to provide us the final decision as to the detection of a human within the surveillance area.

In the case of event modeling, other embodiments of the present invention would track the detected human across multiple images and identify the type of action being performed. It may be important for a given application that the human not walk in a certain direction or run, etc. within a restricted area. In order to perform event modeling, an additional motion signature module would first extract motion signatures from the detected humans. These motion signature would be learned using a classification algorithm such as NDA or C5 and would eventually be used to detect events of interest.

From the foregoing description, it will be apparent that the present invention has a number of advantages, some of which have been described above, and others of which are inherent in the embodiments of the invention described above. For example, other classification techniques may be used to classify the status of an object. Also, it will be understood that modifications can be made to the object detection system described above without departing from the teachings of subject matter described herein. As such, the invention is not to be limited to the described embodiments except as required by the appended claims.

What is claimed is:

1. A computer implemented method of object detection comprising an act of causing a processor to perform operations of:
   receiving images of an area occupied by at least one object;
   extracting image features including wavelet features from the images;
   classifying the image features to produce object class confidence data, wherein the classifying operation is performed by at least two sub-classifiers; and
   performing data fusion on the object class confidence data to produce a detected object estimate, wherein the operation of performing data fusion comprises the operations of:
      initially training the sub-classifiers in a supervised way by using the image features as inputs to the sub-classifiers and by using correct decisions known a priori as outputs of the sub-classifiers;
      training a fusion classifier by using confidence values generated by the trained sub-classifiers as inputs to the fusion classifier and by using correct decisions known a priori as outputs of the fusion classifier; and
      using the trained sub-classifiers and trained fusion classifier to perform data fusion to produce a detected object estimate when the correct decisions are unknown;
   wherein the operation of classifying image features comprises processing the image features with at least one classification algorithm; and
   wherein at least one of the classification algorithms is selected from the group consisting of a trained C5 decision tree, a trained Nonlinear Discriminant Analysis network, and a trained Fuzzy Aggregation Network.

2. A computer implemented method of object detection comprising an act of causing a processor to perform operations of:
   receiving images of an area occupied by at least one object;
   extracting image features including wavelet features from the images;
   classifying the image features to produce object class confidence data, wherein the classifying operation is performed by at least two sub-classifiers; and
   performing data fusion on the object class confidence data to produce a detected object estimate, wherein the operation of performing data fusion comprises the operations of:
      initially training the sub-classifiers in a supervised way by using the image features as inputs to the sub-classifiers and by using correct decisions known a priori as outputs of the sub-classifiers;

training a fusion classifier by using confidence values generated by the trained sub-classifiers as inputs to the fusion classifier and by using correct decisions known a priori as outputs of the fusion classifier; and using the trained sub-classifiers and trained fusion classifier to perform data fusion to produce a detected object estimate when the correct decisions are unknown;

wherein the operation of classifying image features comprises processing the image features with at least one classification algorithm;

wherein the operation of extracting image features comprises the operation of:

extracting wavelet coefficients of the at least one object occupying an area of the images; and wherein the operation of classifying the image features comprises processing the wavelet coefficients with at least one classification algorithm to produce object class confidence data; and wherein at least one of the classification algorithms is selected from the group consisting of a trained C5 decision tree, a trained Nonlinear Discriminant Analysis network, and a trained Fuzzy Aggregation Network.

3. The method of claim 2, where the at least one object comprises a vehicle occupant and the area comprises a vehicle occupancy area, and further comprising an operation of processing the detected object estimate to provide signals to vehicle systems.

4. The method of claim 3, wherein the signals comprise airbag enable and disable signals.

5. The method of claim 4, wherein the method further comprises an operation of capturing images from a sensor selected from a group consisting of CMOS vision sensors and CCD vision sensors.

6. A computer implemented method of object detection comprising an act of causing a processor to perform operations of:

receiving images of an area occupied by at least one object;

extracting image features including wavelet features from the images;

classifying the image features to produce object class confidence data, wherein the classifying operation is performed by at least two sub-classifiers; and performing data fusion on the object class confidence data to produce a detected object estimate, wherein the operation of performing data fusion comprises the operations of:

initially training the sub-classifiers in a supervised way by using the image features as inputs to the sub-classifiers and by using correct decisions known a priori as outputs of the sub-classifiers;

training a fusion classifier by using confidence values generated by the trained sub-classifiers as inputs to the fusion classifier and by using correct decisions known a priori as outputs of the fusion classifier; and using the trained sub-classifiers and trained fusion classifier to perform data fusion to produce a detected object estimate when the correct decisions are unknown;

wherein the operation of classifying image features comprises processing the image features with at least one classification algorithm;

wherein the operation of extracting image features comprises the operation of:

extracting wavelet coefficients of the at least one object occupying an area of the images; and wherein the operation of classifying the image features comprises processing the wavelet coefficients with at least one classification algorithm to produce object class confidence data; and wherein the operation of extracting image features further comprises the operations of:

detecting edges of the at least one object within the images;

masking the edges with a background mask to find important edges;

calculating edge pixels from the important edges; and producing edge density maps from the important edges, the edge density map providing the image features, and wherein the operation of classifying the image features comprises processing the edge density map with at least one of the classification algorithms to produce object class confidence data.

7. The method of claim 6, wherein the operation of extracting image features further comprises the operations of:

receiving a stereoscopic pair of images of an area occupied by at least one object;

detecting pattern regions and non-pattern regions within each of the pair of images using a texture filter;

generating an initial estimate of spatial disparities between the pattern regions within each of the pair of images;

using the initial estimate to generate a subsequent estimate of the spatial disparities between the non-pattern regions based on the spatial disparities between the pattern regions using disparity constraints; and wherein the disparity constraints comprise consistency requirement constraints and local smoothness constraints, wherein the consistency requirement constraints are defined by $$d_{min}^{(i)} = d^{(i-1)} - \varepsilon$$

$$d_{max}^{(i)} = d^{(i+1)} + \varepsilon$$

$$\varepsilon = |x_i - x_{i-1}|$$

where $\varepsilon$ denotes the horizontal distance between blocks i and i−1;

$d^{(i)}$ denotes disparity in a given block i within an image;

$x_i$ denotes the image x-coordinate (horizontal coordinate) in a given block i within an image;

$d^{(i)}_{min}$ denotes minimum value of the disparity in a given block i within an image;

$d^{(i)}_{max}$ denotes maximum value of the disparity in a given block i within an image; and wherein the local smoothness constraints are defined by $$d_{min} = \min\{d \in N_{ij}\} - \eta$$

$$d_{max} = \max\{d \in N_{ij}\} + \eta$$

$$N_{ij} = \{p_{m,n}\} \; m = i-1, \ldots, i+1 \; n = j-1, \ldots, j+1$$

where $N_{ij}$ denotes a local neighborhood of fixed size centered on the current pixel containing the disparity values;

i denotes index of horizontal coordinate in the local neighborhood $N_{ij}$;

j denotes index of vertical coordinate in a given block in the local neighborhood $N_{ij}$;

η denotes an adjustable parameter for controlling the smoothness constraint;

d denotes disparity within the local neighborhood $N_{ij}$;

$d^{(i)}_{min}$ denotes minimum value of the disparity in a given block i within an image;

$d^{(i)}_{max}$ denotes maximum value of the disparity in a given block i within an image; and $p_{m,n}$ denotes the disparity map for the entire image;

iteratively using the subsequent estimate as the initial estimate in the operation of using the initial estimate to generate a subsequent estimate in order to generate further subsequent estimates of the spatial disparities between the non-pattern regions based on the spatial disparities between the pattern regions using the disparity constraints until there is no change between the results of subsequent iterations, thereby generating a final estimate of the spatial disparities; and generating a disparity map of the area occupied by at least one object from the final estimate of the spatial disparities, and wherein the operation of classifying the image features comprises processing the disparity map with at least one of the classification algorithms to produce object class confidence data.

8. The method of claim 7, further comprising the operations of:

detecting motion of the at least one object within the images;

calculating motion pixels from the motion; and producing motion density maps from the motion pixels, the motion density map providing the image features; and wherein the operation of classifying the image features comprises processing the motion density map with at least one of the classification algorithms to produce object class confidence data, which is used independently of the data fusion to produce an independent detected object estimate.

9. The method of claim 8, where the at least one object comprises a vehicle occupant and the area comprises a vehicle occupancy area, and further comprising an operation of processing the detected object estimate to provide signals to vehicle systems.

10. The method of claim 9, wherein the signals comprise airbag enable and disable signals.

11. The method of claim 10, wherein the method further comprises an operation of capturing images from a sensor selected from a group consisting of CMOS vision sensors and CCD vision sensors.

12. The method of claim 11, wherein at least one of the classification algorithms is selected from the group consisting of a trained C5 decision tree, a trained Nonlinear Discriminant Analysis network, and a trained Fuzzy Aggregation Network.

13. The method of claim 7, further comprising the operations of:

detecting motion of the at least one object within the images;

calculating motion pixels from the motion; and producing motion density maps from the motion pixels, the motion density map providing the image features; and wherein the operation of classifying the image features comprises processing the motion density map with at least one of the classification algorithms to produce object class confidence data.

14. The method of claim 13, where the at least one object comprises a vehicle occupant and the area comprises a vehicle occupancy area, and further comprising an operation of processing the detected object estimate to provide signals to vehicle systems.

15. The method of claim 14, wherein the signals comprise airbag enable and disable signals.

16. The method of claim 15, wherein the method further comprises an operation of capturing images from a sensor selected from a group consisting of CMOS vision sensors and CCD vision sensors.

17. The method of claim 16, wherein at least one of the classification algorithms is selected from the group consisting of a trained C5 decision tree, a trained Nonlinear Discriminant Analysis network, and a trained Fuzzy Aggregation Network.

18. A computer implemented method of object detection comprising an act of causing a processor to perform operations of:

receiving images of an area occupied by at least one object;

extracting image features including wavelet features from the images;

classifying the image features to produce object class confidence data, wherein the classifying operation is performed by at least two sub-classifiers; and performing data fusion on the object class confidence data to produce a detected object estimate, wherein the operation of performing data fusion comprises the operations of;

initially training the sub-classifiers in a supervised way by using the image features as inputs to the sub-classifiers and by using correct decisions known a priori as outputs of the sub-classifiers;

training a fusion classifier by using confidence values generated by the trained sub-classifiers as inputs to the fusion classifier and by using correct decisions known a priori as Outputs of the fusion classifier; and using the trained sub-classifiers and trained fusion classifier to perform data fusion to produce a detected object estimate when the correct decisions are unknown;

wherein the operation of classifying image features comprises processing the image features with at least one classification algorithm;

wherein the operation of extracting image features comprises the operation of:

extracting wavelet coefficients of the at least one object occupying an area of the images; and wherein the operation of classifying the image features comprises processing the wavelet coefficients with at least one classification algorithm to produce object class confidence data; and wherein the operation of extracting image features further comprises the operations of:

receiving a stereoscopic pair of images of an area occupied by at least one object;

detecting pattern regions and non-pattern regions within each of the pair of images using a texture filter;

generating an initial estimate of spatial disparities between the pattern regions within each of the pair of images;

using the initial estimate to generate a subsequent estimate of the spatial disparities between the non-pattern regions based on the spatial disparities between the pattern regions using disparity constraints; and wherein the disparity constraints comprise consistency requirement constraints and local smoothness constraints, wherein the consistency requirement constraints are defined by $$d_{min}^{(i)} = d^{(i-1)} - \varepsilon$$

$$d_{max}^{(i)} = d^{(i+1)} + \varepsilon$$

$$\varepsilon = |x_i - x_{i-1}|$$

where
$\varepsilon$ denotes the horizontal distance between blocks i and i−1;
$d^{(i)}$ denotes disparity in a given block i within an image;
$x_i$ denotes the image x-coordinate (horizontal coordinate) in a given block i within an image;
$d^{(i)}_{min}$ denotes minimum value of the disparity in a given block i within an image;
$d^{(i)}_{max}$ denotes maximum value of the disparity in a given block i within an image; and
wherein the local smoothness constraints are defined by $$d_{min} = \min\{d \in N_{ij}\} - \eta$$

$$N_{ij} = \{p_{m,n}\}\ m = i-1, \ldots, i+1\ n = j-1, \ldots, j+1$$

where
$N_{ij}$ denotes a local neighborhood of fixed size centered on the current pixel containing the disparity values;
i denotes index of horizontal coordinate in the local neighborhood $N_{ij}$;
j denotes index of vertical coordinate in a given block in the local neighborhood $N_{ij}$;
$\eta$ denotes an adjustable parameter for controlling the smoothness constraint;
d denotes disparity within the local neighborhood $N_{ij}$;
$d^{(i)}_{min}$ denotes minimum value of the disparity in a given block i within an image;
$d^{(i)}_{max}$ denotes maximum value of the disparity in a given block i within an image; and
$p_{m,n}$ denotes the disparity map for the entire image;
iteratively using the subsequent estimate as the initial estimate in the operation of using the initial estimate to generate a subsequent estimate in order to generate further subsequent estimates of the spatial disparities between the non-pattern regions based on the spatial disparities between the pattern regions using the disparity constraints until there is no change between the results of subsequent iterations, thereby generating a final estimate of the spatial disparities; and
generating a disparity map of the area occupied by at least one object from the final estimate of the spatial disparities, and wherein the operation of classifying the image features comprises processing the disparity map with at least one of the classification algorithms to produce object class confidence data.

19. The method of claim 18, wherein the operation of extracting image features further comprises the operations of:
detecting edges of the at least one object within the images;
masking the edges with a background mask to find important edges;
calculating edge pixels from the important edges; and
producing edge density maps from the important edges, the edge density map providing the image features, and wherein the operation of classifying the image features comprises processing the edge density map with at least one of the classification algorithms to produce object class confidence data.

20. The method of claim 19, further comprising the operations of:
detecting motion of the at least one object within the images;
calculating motion pixels from the motion; and
producing motion density maps from the motion pixels, the motion density map providing the image features; and
wherein the operation of classifying the image features comprises processing the motion density map with at least one of the classification algorithms to produce object class confidence data, which is used independently of the data fusion to produce an independent detected object estimate.

21. The method of claim 20, where the at least one object comprises a vehicle occupant and the area comprises a vehicle occupancy area, and further comprising an operation of processing the detected object estimate to provide signals to vehicle systems.

22. The method of claim 21, wherein the signals comprise airbag enable and disable signals.

23. The method of claim 22, wherein the method further comprises an operation of capturing images from a sensor selected from a group consisting of CMOS vision sensors and CCD vision sensors.

24. The method of claim 23, wherein at least one of the classification algorithms is selected from the group consisting of a trained C5 decision tree, a trained Nonlinear Discriminant Analysis network, and a trained Fuzzy Aggregation Network.

25. The method of claim 19, further comprising the operations of:
detecting motion of the at least one object within the images;
calculating motion pixels from the motion; and
producing motion density maps from the motion pixels, the motion density map providing the image features; and
wherein the operation of classifying the image features comprises processing the motion density map with at least one of the classification algorithms to produce object class confidence data.

26. The method of claim 25, where the at least one object comprises a vehicle occupant and the area comprises a vehicle occupancy area, and further comprising an operation of processing the detected object estimate to provide signals to vehicle systems.

27. The method of claim 26, wherein the signals comprise airbag enable and disable signals.

28. The method of claim 27, wherein the method further comprises an operation of capturing images from a sensor selected from a group consisting of CMOS vision sensors and CCD vision sensors.

29. The method of claim 28, wherein at least one of the classification algorithms is selected from the group consisting of a trained C5 decision tree, a trained Nonlinear Discriminant Analysis network, and a trained Fuzzy Aggregation Network.

30. A computer implemented method of object detection comprising an act of causing a processor to perform operations of:
receiving images of an area occupied by at least one object;
extracting image features including wavelet features from the images;

classifying the image features to produce object class confidence data, wherein the classifying operation is performed by at least two sub-classifiers; and performing data fusion on the object class confidence data to produce a detected object estimate, wherein the operation of performing data fusion comprises the operations of:

initially training the sub-classifiers in a supervised way by using the image features as inputs to the sub-classifiers and by using correct decisions known a priori as outputs of the sub-classifiers;

training a fusion classifier by using confidence values generated by the trained sub-classifiers as inputs to the fusion classifier and by using correct decisions known a priori as outputs of the fusion classifier; and using the trained sub-classifiers and trained fusion classifier to perform data fusion to produce a detected object estimate when the correct decisions are unknown where the at least one object comprises a vehicle occupant and the area comprises a vehicle occupancy area, and further comprising an operation of processing the detected object estimate to provide signals to vehicle systems;

wherein the signals comprise airbag enable and disable signals;

wherein the method further comprises an operation of capturing images from a sensor selected from a group consisting of CMOS vision sensors and CCD vision sensors; and wherein at least one of the classification algorithms is selected from the group consisting of a trained C5 decision tree, a trained Nonlinear Discriminant Analysis network, and a trained Fuzzy Aggregation Network.

31. A computer implemented method of object detection comprising an act of causing a processor to perform operations of:

receiving a stereoscopic pair of images of an area occupied by at least one object;

extracting image features from the images, with at least a portion of the image features being extracted by the operations of:

detecting pattern regions and non-pattern regions within each of the pair of images using a texture filter;

generating an initial estimate of spatial disparities between the pattern regions within each of the pair of images;

using the initial estimate to generate a subsequent estimate of the spatial disparities between the non-pattern regions based on the spatial disparities between the pattern regions using disparity constraints;

iteratively using the subsequent estimate as the initial estimate in the operation of using the initial estimate to generate a subsequent estimate in order to generate further subsequent estimates of the spatial disparities between the non-pattern regions based on the spatial disparities between the pattern regions using the disparity constraints until there is no change between the results of subsequent iterations, thereby generating a final estimate of the spatial disparities;

generating a disparity map of the area occupied by at least one object from the final estimate of the spatial disparities;

classifying the image features to produce object class confidence data, wherein the classifying operation is performed by at least two sub-classifiers and with at least a portion of the classifying being performed by processing the disparity map with at least one classification algorithm to produce object class confidence data; and performing data fusion on the object class confidence data to produce a detected object estimate, wherein the operation of performing data fusion comprises the operations of:

initially training the sub-classifiers in a supervised way by using the image features as inputs to the sub-classifiers and by using correct decisions known a priori as outputs of the sub-classifiers;

training a fusion classifier by using confidence values generated by the trained sub-classifiers as inputs to the fusion classifier and by using correct decisions known a priori as outputs of the fusion classifier; and using the trained sub-classifiers and trained fusion classifier to perform data fusion to produce a detected object estimate when the correct decisions are unknown.

32. The method of claim 31, wherein the operation of classifying image features comprises processing the image features with at least one classification algorithm.

33. The method of claim 32, wherein at least one of the classification algorithms is selected from the group consisting of a trained C5 decision tree, a trained Nonlinear Discriminant Analysis network, and a trained Fuzzy Aggregation Network.

34. The method of claim 31, wherein the operation of extracting image features further comprises the operations of:

detecting edges of the at least one object within the pair of images;

masking the edges with a background mask to find important edges;

calculating edge pixels from the important edges; and producing edge density maps from the important edges, the edge density map providing the image features, and wherein the operation of classifying the image features comprises processing the edge density map with at least one of the classification algorithms to produce object class confidence data.

35. The method of claim 34, further comprising the operations of:

detecting motion of the at least one object within the images;

calculating motion pixels from the motion; and producing motion density maps from the motion pixels, the motion density map providing the image features; and wherein the operation of classifying the image features comprises processing the motion density map with at least one of the classification algorithms to produce object class confidence data, which is used independently of the data fusion to produce an independent detected object estimate.

36. The method of claim 35, where the at least one object comprises a vehicle occupant and the area comprises a vehicle occupancy area, and further comprising an operation of processing the detected object estimate to provide signals to vehicle systems.

37. The method of claim 36, wherein the signals comprise airbag enable and disable signals.

38. The method of claim 37, wherein the method further comprises an operation of capturing images from a sensor selected from a group consisting of CMOS vision sensors and CCD vision sensors.

39. The method of claim 38, wherein at least one of the classification algorithms is selected from the group consisting of a trained C5 decision tree, a trained Nonlinear Discriminant Analysis network, and a trained Fuzzy Aggregation Network.

40. The method of claim 34, further comprising the operations of:
   detecting motion of the at least one object within the images;
   calculating motion pixels from the motion; and
   producing motion density maps from the motion pixels, the motion density map providing the image features; and
   wherein the operation of classifying the image features comprises processing the motion density map with at least one of the classification algorithms to produce object class confidence data.

41. The method of claim 40, where the at least one object comprises a vehicle occupant and the area comprises a vehicle occupancy area, and further comprising an operation of processing the detected object estimate to provide signals to vehicle systems.

42. The method of claim 41, wherein the signals comprise airbag enable and disable signals.

43. The method of claim 42, wherein the method further comprises an operation of capturing images from a sensor selected from a group consisting of CMOS vision sensors and CCD vision sensors.

44. The method of claim 43, wherein at least one of the classification algorithms is selected from the group consisting of a trained C5 decision tree, a trained Nonlinear Discriminant Analysis network, and a trained Fuzzy Aggregation Network.

45. The method of claim 31, where the at least one object comprises a vehicle occupant and the area comprises a vehicle occupancy area, and further comprising an operation of processing the detected object estimate to provide signals to vehicle systems.

46. The method of claim 45, wherein the signals comprise airbag enable and disable signals.

47. The method of claim 46, wherein the method further comprises an operation of capturing images from a sensor selected from a group consisting of CMOS vision sensors and CCD vision sensors.

48. The method of claim 47, wherein at least one of the classification algorithms is selected from the group consisting of a trained C5 decision tree, a trained Nonlinear Discriminant Analysis network, and a trained Fuzzy Aggregation Network.

49. A computer program product for object detection, the computer program product comprising means, stored on a computer readable medium, for:
   receiving images of an area occupied by at least one object;
   extracting image features including wavelet features from the images;
   classifying the image features to produce object class confidence data, wherein the classifying means use at least two sub-classifiers; and
   performing data fusion on the object class confidence data to produce a detected object estimate, wherein the means for performing data fusion comprises the means for:
      initially training the sub-classifiers in a supervised way by using the image features as inputs to the sub-classifiers and by using correct decisions known a priori as outputs of the sub-classifiers;
      training a fusion classifier by using confidence values generated by the trained sub-classifiers as inputs to the fusion classifier and by using correct decisions known a priori as outputs of the fusion classifier; and
      using the trained sub-classifiers and trained fusion classifier to perform data fusion to produce a detected object estimate when the correct decisions are unknown;
   wherein the means for classifying image features comprises a means for processing the image features with at least one classification algorithm; and
   wherein at least one of the classification algorithms is selected from the group consisting of a trained C5 decision tree, a trained Nonlinear Discriminant Analysis network, and a trained Fuzzy Aggregation Network.

50. A computer program product for object detection, the computer program product comprising means, stored on a computer readable medium, for:
   receiving images of an area occupied by at least one object;
   extracting image features including wavelet features from the images;
   classifying the image features to produce object class confidence data, wherein the classifying means use at least two sub-classifiers; and
   performing data fusion on the object class confidence data to produce a detected object estimate, wherein the means for performing data fusion comprises the means for;
      initially training the sub-classifiers in a supervised way by using the image features as inputs to the sub-classifiers and by using correct decisions known a priori as outputs of the sub-classifiers;
      training a fusion classifier by using confidence values generated by the trained sub-classifiers as inputs to the fusion classifier and by using correct decisions known a priori as outputs of the fusion classifier; and
      using the trained sub-classifiers and trained fusion classifier to perform data fusion to produce a detected object estimate when the correct decisions are unknown;
   wherein the means for extracting image features comprises a means for:
      extracting wavelet coefficients of the at least one object in the images; and wherein the means for classifying the image features comprises processing the wavelet coefficients with at least one classification algorithm to produce object class confidence data; and
   wherein at least one of the classification algorithms is selected from the group consisting of a trained C5 decision tree, a trained Nonlinear Discriminant Analysis network, and a trained Fuzzy Aggregation Network.

51. A computer program product for object detection as set forth in claim 50, where the at least one object comprises a vehicle occupant and the area comprises a vehicle occupancy area, and further comprising a means for processing the detected object estimate to provide signals to vehicle systems.

52. A computer program product for object detection as set forth in claim 51, wherein the signals comprise airbag enable and disable signals.

53. A computer program product for object detection as set forth in claim 52, wherein the computer program product further comprises a means for capturing images from a sensor selected from a group consisting of CMOS vision sensors and CCD vision sensors.

54. A computer program product for object detection, the computer program product comprising means, stored on a computer readable medium, for:
   receiving images of an area occupied by at least one object;
   extracting image features including wavelet features from the images;

classifying the image features to produce object class confidence data, wherein the classifying means use at least two sub-classifiers; and performing data fusion on the object class confidence data to produce a detected object estimate, wherein the means for performing data fusion comprises the means for:

initially training the sub-classifiers in a supervised way by using the image features as inputs to the sub-classifiers and by using correct decisions known a priori as outputs of the sub-classifiers;

training a fusion classifier by using confidence values generated by the trained sub-classifiers as inputs to the fusion classifier and by using correct decisions known a priori as outputs of the fusion classifier; and using the trained sub-classifiers and trained fusion classifier to perform data fusion to produce a detected object estimate when the correct decisions are unknown;

wherein the means for extracting image features comprises a means for;

extracting wavelet coefficients of the at least one object in the images; and wherein the means for classifying the image features comprises processing the wavelet coefficients with at least one classification algorithm to produce object class confidence data; and wherein the means for extracting image features further comprises means for:

detecting edges of the at least one object within the images;

masking the edges with a background mask to find important edges;

calculating edge pixels from the important edges; and producing edge density maps from the important edges, the edge density map providing the image features, and wherein the means for classifying the image features processes the edge density map with at least one of the classification algorithms to produce object class confidence data.

55. A computer program product for object detection as set forth in claim 54, wherein the means for extracting image features further comprises means for:

receiving a stereoscopic pair of images of an area occupied by at least one object;

detecting pattern regions and non-pattern regions within each of the pair of images using a texture filter;

generating an initial estimate of spatial disparities between the pattern regions within each of the pair of images;

using the initial estimate to generate a subsequent estimate of the spatial disparities between the non-pattern regions based on the spatial disparities between the pattern regions using disparity constraints; and wherein the disparity constraints comprise consistency requirement constraints and local smoothness constraints, wherein the consistency requirement constraints are defined by $$d_{min}^{(i)} = d^{(i-1)} - \varepsilon$$

$$d_{max}^{(i)} = d^{(i+1)} + \varepsilon$$

$$\varepsilon = |x_i - x_{i-1}|$$

where $\varepsilon$ denotes the horizontal distance between blocks i and i−1;

$d^{(i)}$ denotes disparity in a given block i within an image;

$x_i$ denotes the image x-coordinate (horizontal coordinate) in a given block i within an image;

$d^{(i)}_{min}$ denotes minimum value of the disparity in a given block i within an image;

$d^{(i)}_{max}$ denotes maximum value of the disparity in a given block i within an image; and wherein the local smoothness constraints are defined by $$d_{min} = \min\{d \in N_{ij}\} - \eta$$

$$d_{max} = \max\{d \in N_{ij}\} + \eta$$

$$N_{ij} = \{p_{m,n}\} \; m = i-1, \ldots, i+1 \; n = j-1, \ldots, j+1$$

where $N_{ij}$ denotes a local neighborhood of fixed size centered on the current pixel containing the disparity values;

i denotes index of horizontal coordinate in the local neighborhood $N_{ij}$;

j denotes index of vertical coordinate in a given block in the local neighborhood $N_{ij}$;

$\eta$ denotes an adjustable parameter for controlling the smoothness constraint;

d denotes disparity within the local neighborhood $N_{ij}$;

$d^{(i)}_{min}$ denotes minimum value of the disparity in a given block i within an image;

$d^{(i)}_{max}$ denotes maximum value of the disparity in a given block i within an image; and $p_{m,n}$ denotes the disparity map for the entire image;

iteratively using the subsequent estimate as the initial estimate in the means for using the initial estimate to generate a subsequent estimate in order to generate further subsequent estimates of the spatial disparities between the non-pattern regions based on the spatial disparities between the pattern regions using the disparity constraints until there is no change between the results of subsequent iterations, thereby generating a final estimate of the spatial disparities; and generating a disparity map of the area occupied by at least one object from the final estimate of the spatial disparities, and wherein the means for classifying the image features processes the disparity map with at least one of the classification algorithms to produce object class confidence data.

56. A computer program product for object detection as set forth in claim 55, further comprising means for:

detecting motion of the at least one object within the images;

calculating motion pixels from the motion; and producing motion density maps from the motion pixels, the motion density map providing the image features; and wherein the means for classifying the image features processes the motion density map with at least one of the classification algorithms to produce object class confidence data, which is used independently of the data fusion to produce an independent detected object estimate.

57. A computer program product for object detection as set forth in claim 56, where the at least one object comprises a vehicle occupant and the area comprises a vehicle occupancy area, and further comprising a means for processing the detected object estimate to provide signals to vehicle systems.

58. A computer program product for object detection as set forth in claim 57, wherein the signals comprise airbag enable and disable signals.

59. A computer program product for object detection as set forth in claim 58, wherein the computer program product further comprises a means for capturing images from a sensor selected from a group consisting of CMOS vision sensors and CCD vision sensors.

60. A computer program product for object detection as set forth in claim 59, wherein at least one of the classification algorithms is selected from the group consisting of a trained C5 decision tree, a trained Nonlinear Discriminant Analysis network, and a trained Fuzzy Aggregation Network.

61. A computer program product for object detection as set forth in claim 54, further comprising means for:
   detecting motion of the at least one object within the images;
   calculating motion pixels from the motion; and
   producing motion density maps from the motion pixels, the motion density map providing the image features; and
   wherein the means for classifying the image features processes the motion density map with at least one of the classification algorithms to produce object class confidence data.

62. A computer program product for object detection as set forth in claim 61, where the at least one object comprises a vehicle occupant and the area comprises a vehicle occupancy area, and further comprising a means for processing the detected object estimate to provide signals to vehicle systems.

63. A computer program product for object detection as set forth in claim 62, wherein the signals comprise airbag enable and disable signals.

64. The computer program product of claim 63, wherein the computer program product further comprises a means for capturing images from a sensor selected from a group consisting of CMOS vision sensors and CCD vision sensors.

65. A computer program product for object detection as set forth in claim 64, wherein at least one of the classification algorithms is selected from the group consisting of a trained C5 decision tree, a trained Nonlinear Discriminant Analysis network, and a trained Fuzzy Aggregation Network.

66. A computer program product for object detection, the computer program product comprising means, stored on a computer readable medium, for:
   receiving images of an area occupied by at least one object;
   extracting image features including wavelet features from the images;
   classifying the image features to produce object class confidence data, wherein the classifying means use at least two sub-classifiers; and
   performing data fusion on the object class confidence data to produce a detected object estimate, wherein the means for performing data fusion comprises the means for:
      initially training the sub-classifiers in a supervised way by using the image features as inputs to the sub-classifiers and by using correct decisions known a priori as outputs of the sub-classifiers;
      training a fusion classifier by using confidence values generated by the trained sub-classifiers as inputs to the fusion classifier and by using correct decisions known a priori as outputs of the fusion classifier; and
      using the trained sub-classifiers and trained fusion classifier to perform data fusion to produce a detected object estimate when the correct decisions are unknown;
   wherein the means for extracting image features comprises a means for:
      extracting wavelet coefficients of the at least one object in the images; and wherein the means for classifying the image features comprises processing the wavelet coefficients with at least one classification algorithm to produce object class confidence data; and wherein the means for extracting image features further comprises means for:
   receiving a stereoscopic pair of images of an area occupied by at least one object;
   detecting pattern regions and non-pattern regions within each of the pair of images using a texture filter;
   generating an initial estimate of spatial disparities between the pattern regions within each of the pair of images;
   using the initial estimate to generate a subsequent estimate of the spatial disparities between the non-pattern regions based on the spatial disparities between the pattern regions using disparity constraints; and wherein the disparity constraints comprise consistency requirement constraints and local smoothness constraints, wherein the consistency requirement constraints are defined by $$d_{min}^{(i)} = d^{(i-1)} - \varepsilon$$
$$d_{max}^{(i)} = d^{(i+1)} + \varepsilon$$
$$\varepsilon = |x_i - x_{i-1}|$$

where
   $\varepsilon$ denotes the horizontal distance between blocks i and i−1;
   $d^{(i)}$ denotes disparity in a given block i within an image;
   $x_i$ denotes the image x-coordinate (horizontal coordinate) in a given block i within an image;
   $d^{(i)}_{min}$ denotes minimum value of the disparity in a given block i within an image;
   $d^{(i)}_{max}$ denotes maximum value of the disparity in a given block i within an image; and
wherein the local smoothness constraints are defined by $$d_{min} = \min\{d \in N_{ij}\} - \eta$$
$$d_{max} = \max\{d \in N_{ij}\} + \eta$$
$$N_{ij} = \{p_{m,n}\} \; m = i-1, \ldots, i+1 \; n = j-1, \ldots, j+1$$

where
   $N_{ij}$ denotes a local neighborhood of fixed size centered on the current pixel containing the disparity values;
   i denotes index of horizontal coordinate in the local neighborhood $N_{ij}$;
   j denotes index of vertical coordinate in a given block in the local neighborhood $N_{ij}$;
   $\eta$ denotes an adjustable parameter for controlling the smoothness constraint;
   d denotes disparity within the local neighborhood $N_{ij}$;
   $d^{(i)}_{min}$ denotes minimum value of the disparity in a given block i within an image;
   $d^{(i)}_{max}$ denotes maximum value of the disparity in a given block i within an image; and
   $p_{m,n}$ denotes the disparity map for the entire image;
iteratively using the subsequent estimate as the initial estimate in the means for using the initial estimate to generate a subsequent estimate in order to generate further subsequent estimates of the spatial disparities between the non-pattern regions based on the spatial disparities between the pattern regions using the disparity constraints until there is no change between the results of subsequent iterations, thereby generating a final estimate of the spatial disparities; and generating a disparity map of the area occupied by at least one object from the final estimate of the spatial disparities, and wherein the means for classifying the image features processes the disparity map with at least one of the classification algorithms to produce object class confidence data.

67. A computer program product for object detection as set forth in claim 66, wherein the means for extracting image features further comprises means for:
    detecting edges of the at least one object within the images;
    masking the edges with a background mask to find important edges;
    calculating edge pixels from the important edges; and
    producing edge density maps from the important edges, the edge density map providing the image features, and wherein the means for classifying the image features processes the edge density map with at least one of the classification algorithms to produce object class confidence data.

68. A computer program product for object detection as set forth in claim 67, further comprising means for:
    detecting motion of the at least one object within the images;
    calculating motion pixels from the motion; and
    producing motion density maps from the motion pixels, the motion density map providing the image features; and
    wherein the means for classifying the image features processes the motion density map with at least one of the classification algorithms to produce object class confidence data, which is used independently of the data fusion to produce an independent detected object estimate.

69. A computer program product for object detection as set forth in claim 68, where the at least one object comprises a vehicle occupant and the area comprises a vehicle occupancy area, and further comprising a means for processing the detected object estimate to provide signals to vehicle systems.

70. A computer program product for object detection as set forth in claim 69, wherein the signals comprise airbag enable and disable signals.

71. A computer program product for object detection as set forth in claim 70, wherein the computer program product further comprises a means for capturing images from a sensor selected from a group consisting of CMOS vision sensors and CCD vision sensors.

72. A computer program product for object detection as set forth in claim 71, wherein at least one of the classification algorithms is selected from the group consisting of a trained C5 decision tree, a trained Nonlinear Discriminant Analysis network, and a trained Fuzzy Aggregation Network.

73. A computer program product for object detection as set forth in claim 67, further comprising means for:
    detecting motion of the at least one object within the images;
    calculating motion pixels from the motion; and
    producing motion density maps from the motion pixels, the motion density map providing the image features; and
    wherein the means for classifying the image features processes the motion density map with at least one of the classification algorithms to produce object class confidence data.

74. A computer program product for object detection as set forth in claim 73, where the at least one object comprises a vehicle occupant and the area comprises a vehicle occupancy area, and further comprising a means for processing the detected object estimate to provide signals to vehicle systems.

75. A computer program product for object detection as set forth in claim 74, wherein the signals comprise airbag enable and disable signals.

76. A computer program product for object detection as set forth in claim 75, wherein the computer program product further comprises a means for capturing images from a sensor selected from a group consisting of CMOS vision sensors and CCD vision sensors.

77. A computer program product for object detection as set forth in claim 76, wherein at least one of the classification algorithms is selected from the group consisting of a trained C5 decision tree, a trained Nonlinear Discriminant Analysis network, and a trained Fuzzy Aggregation Network.

78. A computer program product for object detection, the computer program product comprising means, stored on a computer readable medium, for:
    receiving images of an area occupied by at least one object;
    extracting image features including wavelet features from the images;
    classifying the image features to produce object class confidence data, wherein the classifying means use at least two sub-classifiers; and
    performing data fusion on the object class confidence data to produce a detected object estimate, wherein the means for performing data fusion comprises the means for:
        initially training the sub-classifiers in a supervised way by using the image features as inputs to the sub-classifiers and by using correct decisions known a priori as outputs of the sub-classifiers;
        training a fusion classifier by using confidence values generated by the trained sub-classifiers as inputs to the fusion classifier and by using correct decisions known a priori as outputs of the fusion classifier; and
        using the trained sub-classifiers and trained fusion classifier to perform data fusion to produce a detected object estimate when the correct decisions are unknown;
    where the at least one object comprises a vehicle occupant and the area comprises a vehicle occupancy area, and further comprising a means for processing the detected object estimate to provide signals to vehicle systems;
    wherein the signals comprise airbag enable and disable signals;
    wherein the computer program product further comprises a means for capturing images from a sensor selected from a group consisting of CMOS vision sensors and CCD vision sensors; and
    wherein at least one of the classification algorithms is selected from the group consisting of a trained C5 decision tree, a trained Nonlinear Discriminant Analysis network, and a trained Fuzzy Aggregation Network.

79. A computer program product for object detection, the computer program product comprising means, stored on a computer readable medium, for:
    receiving a stereoscopic pair of images of an area occupied by at least one object;
    extracting image features from the images, with at least a portion of the image features being extracted by means for:
        detecting pattern regions and non-pattern regions within each of the pair of images using a texture filter;
        generating an initial estimate of spatial disparities between the pattern regions within each of the pair of images;
        using the initial estimate to generate a subsequent estimate of the spatial disparities between the non-pattern regions based on the spatial disparities between the pattern regions using disparity constraints;

iteratively using the subsequent estimate as the initial estimate in the means for using the initial estimate to generate a subsequent estimate in order to generate further subsequent estimates of the spatial disparities between the non-pattern regions based on the spatial disparities between the pattern regions using the disparity constraints until there is no change between the results of subsequent iterations, thereby generating a final estimate of the spatial disparities;

generating a disparity map of the area occupied by at least one object from the final estimate of the spatial disparities;

classifying the image features to produce object class confidence data, wherein the classifying means use at least two sub-classifiers and with at least a portion of the classifying being performed by processing the disparity map with at least one classification algorithm to produce object class confidence data; and performing data fusion on the object class confidence data to produce a detected object estimate, wherein the means for performing data fusion comprises the means for:

initially training the sub-classifiers in a supervised way by using the image features as inputs to the sub-classifiers and by using correct decisions known a priori as outputs of the sub-classifiers;

training a fusion classifier by using confidence values generated by the trained sub-classifiers as inputs to the fusion classifier and by using correct decisions known a priori as outputs of the fusion classifier; and using the trained sub-classifiers and trained fusion classifier to perform data fusion to produce a detected object estimate when the correct decisions are unknown.

80. A computer program product for object detection as set forth in claim 79, wherein the means for classifying image features processes the image features with at least one classification algorithm.

81. A computer program product for object detection as set forth in claim 80, wherein at least one of the classification algorithms is selected from the group consisting of a trained C5 decision tree, a trained Nonlinear Discriminant Analysis network, and a trained Fuzzy Aggregation Network.

82. A computer program product for object detection as set forth in claim 79, wherein the means for extracting image features further comprises means for:

detecting edges of the at least one object within the images;
masking the edges with a background mask to find important edges;
calculating edge pixels from the important edges; and
producing edge density maps from the important edges, the edge density map providing the image features, and wherein the means for classifying the image features processes the edge density map with at least one of the classification algorithms to produce object class confidence data.

83. A computer program product for object detection as set forth in claim 82, further comprising means for:

detecting motion of the at least one object within the images;
calculating motion pixels from the motion; and
producing motion density maps from the motion pixels, the motion density map providing the image features; and
wherein the means for classifying the image features processes the motion density map with at least one of the classification algorithms to produce object class confidence data, which is used independently of the data fusion to produce an independent detected object estimate.

84. A computer program product for object detection as set forth in claim 83, where the at least one object comprises a vehicle occupant and the area comprises a vehicle occupancy area, and further comprising a means for processing the detected object estimate to provide signals to vehicle systems.

85. A computer program product for object detection as set forth in claim 84, wherein the signals comprise airbag enable and disable signals.

86. A computer program product for object detection as set forth in claim 85, wherein the computer program product further comprises a means for capturing images from a sensor selected from a group consisting of CMOS vision sensors and CCD vision sensors.

87. A computer program product for object detection as set forth in claim 86, wherein at least one of the classification algorithms is selected from the group consisting of a trained C5 decision tree, a trained Nonlinear Discriminant Analysis network, and a trained Fuzzy Aggregation Network.

88. A computer program product for object detection as set forth in claim 79, further comprising means for:

detecting motion of the at least one object within the images;
calculating motion pixels from the motion; and
producing motion density maps from the motion pixels, the motion density map providing the image features; and
wherein the means for classifying the image features processes the motion density map with at least one of the classification algorithms to produce object class confidence data.

89. A computer program product for object detection as set forth in claim 88, where the at least one object comprises a vehicle occupant and the area comprises a vehicle occupancy area, and further comprising a means for processing the detected object estimate to provide signals to vehicle systems.

90. A computer program product for object detection as set forth in claim 89, wherein the signals comprise airbag enable and disable signals.

91. A computer program product for object detection as set forth in claim 90, wherein the computer program product further comprises a means for capturing images from a sensor selected from a group consisting of CMOS vision sensors and CCD vision sensors.

92. A computer program product for object detection as set forth in claim 91, wherein at least one of the classification algorithms is selected from the group consisting of a trained C5 decision tree, a trained Nonlinear Discriminant Analysis network, and a trained Fuzzy Aggregation Network.

93. A computer program product for object detection as set forth in claim 79, where the at least one object comprises a vehicle occupant and the area comprises a vehicle occupancy area, and further comprising a means for processing the detected object estimate to provide signals to vehicle systems.

94. A computer program product for object detection as set forth in claim 93, wherein the signals comprise airbag enable and disable signals.

95. A computer program product for object detection as set forth in claim 94, wherein the computer program product further comprises a means for capturing images from a sensor selected from a group consisting of CMOS vision sensors and CCD vision sensors.

96. A computer program product for object detection as set forth in claim 95, wherein at least one of the classification algorithms is selected from the group consisting of a trained C5 decision tree, a trained Nonlinear Discriminant Analysis network, and a trained Fuzzy Aggregation Network.

97. An apparatus for object detection comprising a computer system including a processor, a memory coupled with the processor, an input coupled with the processor for receiving images, and an output coupled with the processor for outputting information based on an object estimation, wherein the computer system further comprises means, residing in its processor and memory, for:
  receiving images of an area occupied by at least one object;
  extracting image features including wavelet features from the images;
  classifying the image features to produce object class confidence data, wherein the classifying means use at least two sub-classifiers; and
  performing data fusion on the object class confidence data to produce a detected object estimate, wherein the means for performing data fusion comprises the means for:
    initially training the sub-classifiers in a supervised way by using the image features as inputs to the sub-classifiers and by using correct decisions known a priori as outputs of the sub-classifiers;
    training a fusion classifier by using confidence values generated by the trained sub-classifiers as inputs to the fusion classifier and by using correct decisions known a priori as outputs of the fusion classifier; and
    using the trained sub-classifiers and trained fusion classifier to perform data fusion to produce a detected object estimate when the correct decisions are unknown;
  wherein the means for classifying image features comprises a means for processing the image features with at least one classification algorithm; and
  wherein at least one of the classification algorithms is selected from the group consisting of a trained C5 decision tree, a trained Nonlinear Discriminant Analysis network, and a trained Fuzzy Aggregation Network.

98. An apparatus for object detection comprising a computer system including a processor, a memory coupled with the processor, an input coupled with the processor for receiving images, and an output coupled with the processor for outputting information based on an object estimation, wherein the computer system further comprises means, residing in its processor and memory, for:
  receiving images of an area occupied by at least one object:
  extracting image features including wavelet features from the images;
  classifying the image features to produce object class confidence data, wherein the classifying means use at least two sub-classifiers; and
  performing data fusion on the object class confidence data to produce a detected object estimate, wherein the means for performing data fusion comprises the means for:
    initially training the sub-classifiers in a supervised way by using the image features as inputs to the sub-classifiers and by using correct decisions known a priori as outputs of the sub-classifiers;
    training a fusion classifier by using confidence values generated by the trained sub-classifiers as inputs to the fusion classifier and by using correct decisions known a priori as outputs of the fusion classifier; and
    using the trained sub-classifiers and trained fusion classifier to perform data fusion to produce a detected object estimate when the correct decisions are unknown;
  wherein means for extracting image features comprises a means for:
    extracting wavelet coefficients of the at least one object in the images;
  and wherein the means for classifying the image features comprises processing the wavelet coefficients with at least one classification algorithm to produce object class confidence data; and
  wherein at least one of the classification algorithms is selected from the group consisting of a trained C5 decision tree, a trained Nonlinear Discriminant Analysis network, and a trained Fuzzy Aggregation Network.

99. An apparatus for object detection as set forth in claim 98, where the at least one object comprises a vehicle occupant and the area comprises a vehicle occupancy area, and further comprising a means for processing the detected object estimate to provide signals to vehicle systems.

100. An apparatus for object detection as set forth in claim 99, wherein the signals comprise airbag enable and disable signals.

101. An apparatus for object detection as set forth in claim 100, wherein the apparatus further comprises a means for capturing images from a sensor selected from a group consisting of CMOS vision sensors and CCD vision sensors.

102. An apparatus for object detection comprising a computer system including a processor, a memory coupled with the processor, an input coupled with the processor for receiving images, and an output coupled with the processor for outputting information based on an object estimation, wherein the computer system further comprises means, residing in its processor and memory, for:
  receiving images of an area occupied by at least one object;
  extracting image features including wavelet features from the images;
  classifying the image features to produce object class confidence data, wherein the classifying means use at least two sub-classifiers; and
  performing data fusion on the object class confidence data to produce a detected object estimate, wherein the means for performing data fusion comprises the means for:
    initially training the sub-classifiers in a supervised way by using the image features as inputs to the sub-classifiers and by using correct decisions known a priori as outputs of the sub-classifiers;
    training a fusion classifier by using confidence values generated by the trained sub-classifiers as inputs to the fusion classifier and by using correct decisions known a priori as outputs of the fusion classifier; and
    using the trained sub-classifiers and trained fusion classifier to perform data fusion to produce a detected object estimate when the correct decisions are unknown;
  wherein means for extracting image features comprises a means for:
  extracting wavelet coefficients of the at least one object in the images;
  and wherein the means for classifying the image features comprises processing the wavelet coefficients with at least one classification algorithm to produce object class confidence data; and
  wherein the means for extracting image features further comprises means for:
  detecting edges of the at least one object within the images;
  masking the edges with a background mask to find important edges;
  calculating edge pixels from the important edges; and
  producing edge density maps from the important edges, the edge density map providing the image features, and wherein the means for classifying the image features processes the edge density map with at least one of the classification algorithms to produce object class confidence data.

103. An apparatus for object detection as set forth in claim 102, wherein the means for extracting image features further comprises means for:
receiving a stereoscopic pair of images of an area occupied by at least one object;
detecting pattern regions and non-pattern regions within each of the pair of images using a texture filter;
generating an initial estimate of spatial disparities between the pattern regions within each of the pair of images;
using the initial estimate to generate a subsequent estimate of the spatial disparities between the non-pattern regions based on the spatial disparities between the pattern regions using disparity constraints; and wherein the disparity constraints comprise consistency requirement constraints and local smoothness constraints, wherein the consistency requirement constraints are defined by $$d_{min}^{(i)} = d^{(i-1)} - \varepsilon$$

$$d_{max}^{(i)} = d^{(i+1)} + \varepsilon$$

$$\varepsilon = |x_i - x_{i-1}|$$

where
$\varepsilon$ denotes the horizontal distance between blocks i and i−1;
$d^{(i)}$ denotes disparity in a given block i within an image;
$x_i$ denotes the image x-coordinate (horizontal coordinate) in a given block i within an image;
$d^{(i)}_{min}$ denotes minimum value of the disparity in a given block i within an image;
$d^{(i)}_{max}$ denotes maximum value of the disparity in a given block i within an image; and
wherein the local smoothness constraints are defined by $$d_{min} = \min\{d \in N_{ij}\} - \eta$$

$$d_{max} = \max\{d \in N_{ij}\} + \eta$$

$$N_{ij} = \{p_{m,n}\}\ m = i-1, \ldots, i+1\ n = j-1, \ldots, j+1$$

where
$N_{ij}$ denotes a local neighborhood of fixed size centered on the current pixel containing the disparity values;
i denotes index of horizontal coordinate in the local neighborhood $N_{ij}$;
j denotes index of vertical coordinate in a given block in the local neighborhood $N_{ij}$;
$\eta$ denotes an adjustable parameter for controlling the smoothness constraint;
d denotes disparity within the local neighborhood $N_{ij}$;
$d^{(i)}_{min}$ denotes minimum value of the disparity in a given block i within an image;
$d^{(i)}_{max}$ denotes maximum value of the disparity in a given block i within an image; and
$p_{m,n}$ denotes the disparity map for the entire image;
iteratively using the subsequent estimate as the initial estimate in the means for using the initial estimate to generate a subsequent estimate in order to generate further subsequent estimates of the spatial disparities between the non-pattern regions based on the spatial disparities between the pattern regions using the disparity constraints until there is no change between the results of subsequent iterations, thereby generating a final estimate of the spatial disparities; and
generating a disparity map of the area occupied by at least one object from the final estimate of the spatial disparities, and wherein the means for classifying the image features processes the disparity map with at least one of the classification algorithms to produce object class confidence data.

104. An apparatus for object detection as set forth in claim 103, further comprising means for:
detecting motion of the at least one object within the images;
calculating motion pixels from the motion; and
producing motion density maps from the motion pixels, the motion density map providing the image features; and
wherein the means for classifying the image features processes the motion density map with at least one of the classification algorithms to produce object class confidence data, which is used independently of the data fusion to produce an independent detected object estimate.

105. An apparatus for object detection as set forth in claim 104, where the at least one object comprises a vehicle occupant and the area comprises a vehicle occupancy area, and further comprising a means for processing the detected object estimate to provide signals to vehicle systems.

106. An apparatus for object detection as set forth in claim 105, wherein the signals comprise airbag enable and disable signals.

107. An apparatus for object detection as set forth in claim 106, wherein the apparatus further comprises a means for capturing images from a sensor selected from a group consisting of CMOS vision sensors and CCD vision sensors.

108. An apparatus for object detection as set forth in claim 107, wherein at least one of the classification algorithms is selected from the group consisting of a trained C5 decision tree, a trained Nonlinear Discriminant Analysis network, and a trained Fuzzy Aggregation Network.

109. An apparatus for object detection as set forth in claim 103, further comprising means for:
detecting motion of the at least one object within the images;
calculating motion pixels from the motion; and
producing motion density maps from the motion pixels, the motion density map providing the image features; and
wherein the means for classifying the image features processes the motion density map with at least one of the classification algorithms to produce object class confidence data.

110. An apparatus for object detection as set forth in claim 109, where the at least one object comprises a vehicle occupant and the area comprises a vehicle occupancy area, and further comprising a means for processing the detected object estimate to provide signals to vehicle systems.

111. An apparatus for object detection as set forth in claim 110, wherein the signals comprise airbag enable and disable signals.

112. An apparatus for object detection as set forth in claim 111, wherein the apparatus further comprises a means for capturing images from a sensor selected from a group consisting of CMOS vision sensors and CCD vision sensors.

113. An apparatus for object detection as set forth in claim 112, wherein at least one of the classification algorithms is selected from the group consisting of a trained C5 decision tree, a trained Nonlinear Discriminant Analysis network, and a trained Fuzzy Aggregation Network.

114. An apparatus for object detection comprising a computer system including a processor, a memory coupled with the processor, an input coupled with the processor for receiving images, and an output coupled with the processor for outputting information based on an object estimation, wherein the computer system further comprises means, residing in its processor and memory, for:
- receiving images of an area occupied by at least one object;
- extracting image features including wavelet features from the images;
- classifying the image features to produce object class confidence data, wherein the classifying means use at least two sub-classifiers; and
- performing data fusion on the object class confidence data to produce a detected object estimate, wherein the means for performing data fusion comprises the means for:
  - initially training the sub-classifiers in a supervised way by using the image features as inputs to the sub-classifiers and by using correct decisions known a priori as outputs of the sub-classifiers;
  - training a fusion classifier by using confidence values generated by the trained sub-classifiers as inputs to the fusion classifier and by using correct decisions known a priori as outputs of the fusion classifier; and
  - using the trained sub-classifiers and trained fusion classifier to perform data fusion to produce a detected object estimate when the correct decisions are unknown;
- wherein means for extracting image features comprises a means for:
- extracting wavelet coefficients of the at least one object in the images;
- and wherein the means for classifying the image features comprises processing the wavelet coefficients with at least one classification algorithm to produce object class confidence data; and
- wherein the means for extracting image features further comprises means for:
- receiving a stereoscopic pair of images of an area occupied by at least one object;
- detecting pattern regions and non-pattern regions within each of the pair of images using a texture filter;
- generating an initial estimate of spatial disparities between the pattern regions within each of the pair of images;
- using the initial estimate to generate a subsequent estimate of the spatial disparities between the non-pattern regions based on the spatial disparities between the pattern regions using disparity constraints; and wherein the disparity constraints comprise consistency requirement constraints and local smoothness constraints, wherein the consistency requirement constraints are defined by $$d^{(i)}_{min} = d^{(i-1)} - \varepsilon$$

$$d^{(i)}_{max} = d^{(i+1)} + \varepsilon$$

$$\varepsilon = |x_i - x_{i-1}|$$

where
- $\varepsilon$ denotes the horizontal distance between blocks i and i−1;
- $d^{(i)}$ denotes disparity in a given block i within an image;
- $x_i$ denotes the image x-coordinate (horizontal coordinate) in a given block i within an image;
- $d^{(i)}_{min}$ denotes minimum value of the disparity in a given block i within an image;
- $d^{(i)}_{max}$ denotes maximum value of the disparity in a given block i within an image; and wherein the local smoothness constraints are defined by $$d_{min} = \min\{d \in N_{ij}\} - \eta$$

$$d_{max} = \max\{d \in N_{ij}\} + \eta$$

$$N_{ij} = \{p_{m,n}\}\ m = i-1, \ldots, i+1\ n = j-1, \ldots, j+1$$

where
- $N_{ij}$ denotes a local neighborhood of fixed size centered on the current pixel containing the disparity values;
- i denotes index of horizontal coordinate in the local neighborhood $N_{ij}$;
- j denotes index of vertical coordinate in a given block in the local neighborhood $N_{ij}$;
- $\eta$ denotes an adjustable parameter for controlling the smoothness constraint;
- d denotes disparity within the local neighborhood $N_{ij}$;
- $d^{(i)}_{min}$ denotes minimum value of the disparity in a given block i within an image;
- $d^{(i)}_{max}$ denotes maximum value of the disparity in a given block i within an image; and
- $p_{m,n}$ denotes the disparity map for the entire image;
- iteratively using the subsequent estimate as the initial estimate in the means for using the initial estimate to generate a subsequent estimate in order to generate further subsequent estimates of the spatial disparities between the non-pattern regions based on the spatial disparities between the pattern regions using the disparity constraints until there is no change between the results of subsequent iterations, thereby generating a final estimate of the spatial disparities; and
- generating a disparity map of the area occupied by at least one object from the final estimate of the spatial disparities, and wherein the means for classifying the image features processes the disparity map with at least one of the classification algorithms to produce object class confidence data.

115. An apparatus for object detection as set forth in claim 114, wherein the means for extracting image features further comprises means for:
- detecting edges of the at least one object within the images;
- masking the edges with a background mask to find important edges;
- calculating edge pixels from the important edges; and
- producing edge density maps from the important edges, the edge density map providing the image features, and wherein the means for classifying the image features processes the edge density map with at least one of the classification algorithms to produce object class confidence data.

116. An apparatus for object detection as set forth in claim 115, further comprising means for:
- detecting motion of the at least one object within the images;
- calculating motion pixels from the motion; and
- producing motion density maps from the motion pixels, the motion density map providing the image features; and
- wherein the means for classifying the image features processes the motion density map with at least one of the classification algorithms to produce object class confidence data, which is used independently of the data fusion to produce an independent detected object estimate.

117. An apparatus for object detection as set forth in claim 116, where the at least one object comprises a vehicle occupant and the area comprises a vehicle occupancy area, and further comprising a means for processing the detected object estimate to provide signals to vehicle systems.

118. An apparatus for object detection as set forth in claim 117, wherein the signals comprise airbag enable and disable signals.

119. An apparatus for object detection as set forth in claim 118, wherein the apparatus further comprises a means for capturing images from a sensor selected from a group consisting of CMOS vision sensors and CCD vision sensors.

120. An apparatus for object detection as set forth in claim 119, wherein at least one of the classification algorithms is selected from the group consisting of a trained C5 decision tree, a trained Nonlinear Discriminant Analysis network, and a trained Fuzzy Aggregation Network.

121. An apparatus for object detection as set forth in claim 115, further comprising means for:
  detecting motion of the at least one object within the images;
  calculating motion pixels from the motion; and
  producing motion density maps from the motion pixels, the motion density map providing the image features; and
  wherein the means for classifying the image features processes the motion density map with at least one of the classification algorithms to produce object class confidence data.

122. An apparatus for object detection as set forth in claim 121, where the at least one object comprises a vehicle occupant and the area comprises a vehicle occupancy area, and further comprising a means for processing the detected object estimate to provide signals to vehicle systems.

123. An apparatus for object detection as set forth in claim 122, wherein the signals comprise airbag enable and disable signals.

124. An apparatus for object detection as set forth in claim 123, wherein the apparatus further comprises a means for capturing images from a sensor selected from a group consisting of CMOS vision sensors and CCD vision sensors.

125. An apparatus for object detection as set forth in claim 124, wherein at least one of the classification algorithms is selected from the group consisting of a trained C5 decision tree, a trained Nonlinear Discriminant Analysis network, and a trained Fuzzy Aggregation Network.

126. An apparatus for object detection comprising a computer system including a processor, a memory coupled with the processor, an input coupled with the processor for receiving images, and an output coupled with the processor for outputting information based on an object estimation, wherein the computer system further comprises means, residing in its processor and memory, for:
  receiving images of an area occupied by at least one object;
  extracting image features including wavelet features from the images;
  classifying the image features to produce object class confidence data, wherein the classifying means use at least two sub-classifiers; and
  performing data fusion on the object class confidence data to produce a detected object estimate, wherein the means for performing data fusion comprises the means for:
    initially training the sub-classifiers in a supervised way by using the image features as inputs to the sub-classifiers and by using correct decisions known a priori as outputs of the sub-classifiers;
    training a fusion classifier by using confidence values generated by the trained sub-classifiers as inputs to the fusion classifier and by using correct decisions known a priori as outputs of the fusion classifier; and
    using the trained sub-classifiers and trained fusion classifier to perform data fusion to produce a detected object estimate when the correct decisions are unknown;
  where the at least one object comprises a vehicle occupant and the area comprises a vehicle occupancy area, and further comprising a means for processing the detected object estimate to provide signals to vehicle systems;
  wherein the signals comprise airbag enable and disable signals;
  wherein the apparatus further comprises a means for capturing images from a sensor selected from a group consisting of CMOS vision sensors and CCD vision sensors; and
  wherein at least one of the classification algorithms is selected from the group consisting of a trained C5 decision tree, a trained Nonlinear Discriminant Analysis network, and a trained Fuzzy Aggregation Network.

127. An apparatus for object detection comprising a computer system including a processor, a memory coupled with the processor, an input coupled with the processor for receiving images, and an output coupled with the processor for outputting information based on an object estimation, wherein the computer system further comprises means, residing in its processor and memory, for:
  receiving a stereoscopic pair of images of an area occupied by at least one object;
  extracting image features from the images, with at least a portion of the image features being extracted by means for:
    detecting pattern regions and non-pattern regions within each of the pair of images using a texture filter;
    generating an initial estimate of spatial disparities between the pattern regions within each of the pair of images;
    using the initial estimate to generate a subsequent estimate of the spatial disparities between the non-pattern regions based on the spatial disparities between the pattern regions using disparity constraints;
    iteratively using the subsequent estimate as the initial estimate in the means for using the initial estimate to generate a subsequent estimate in order to generate further subsequent estimates of the spatial disparities between the non-pattern regions based on the spatial disparities between the pattern regions using the disparity constraints until there is no change between the results of subsequent iterations, thereby generating a final estimate of the spatial disparities;
    generating a disparity map of the area occupied by at least one object from the final estimate of the spatial disparities;
  classifying the image features to produce object class confidence data, wherein the classifying means use at least two sub-classifiers and with at least a portion of the classifying being performed by processing the disparity map with at least one classification algorithm to produce object class confidence data; and
  performing data fusion on the object class confidence data to produce a detected object estimate, wherein the means for performing data fusion comprises the means for:
    initially training the sub-classifiers in a supervised way by using the image features as inputs to the sub-classifiers and by using correct decisions known a priori as outputs of the sub-classifiers;

training a fusion classifier by using confidence values generated by the trained sub-classifiers as inputs to the fusion classifier and by using correct decisions known a priori as outputs of the fusion classifier; and using the trained sub-classifiers and trained fusion classifier to perform data fusion to produce a detected object estimate when the correct decisions are unknown.

128. An apparatus for object detection as set forth in claim 127, wherein the means for classifying image features processes the image features with at least one classification algorithm.

129. An apparatus for object detection as set forth in claim 128, wherein at least one of the classification algorithms is selected from the group consisting of a trained C5 decision tree, a trained Nonlinear Discriminant Analysis network, and a trained Fuzzy Aggregation Network.

130. An apparatus for object detection as set forth in claim 127, wherein the means for extracting image features further comprises means for:

detecting edges of the at least one object within the images;

masking the edges with a background mask to find important edges;

calculating edge pixels from the important edges; and producing edge density maps from the important edges, the edge density map providing the image features, and wherein the means for classifying the image features processes the edge density map with at least one of the classification algorithms to produce object class confidence data.

131. An apparatus for object detection as set forth in claim 130, further comprising means for:

detecting motion of the at least one object within the images;

calculating motion pixels from the motion; and producing motion density maps from the motion pixels, the motion density map providing the image features; and wherein the means for classifying the image features processes the motion density map with at least one of the classification algorithms to produce object class confidence data, which is used independently of the data fusion to produce an independent detected object estimate.

132. An apparatus for object detection as set forth in claim 131, where the at least one object comprises a vehicle occupant and the area comprises a vehicle occupancy area, and further comprising a means for processing the detected object estimate to provide signals to vehicle systems.

133. An apparatus for object detection as set forth in claim 132, wherein the signals comprise airbag enable and disable signals.

134. An apparatus for object detection as set forth in claim 133, wherein the apparatus further comprises a means for capturing images from a sensor selected from a group consisting of CMOS vision sensors and CCD vision sensors.

135. An apparatus for object detection as set forth in claim 134, wherein at least one of the classification algorithms is selected from the group consisting of a trained C5 decision tree, a trained Nonlinear Discriminant Analysis network, and a trained Fuzzy Aggregation Network.

136. An apparatus for object detection as set forth in claim 130, further comprising means for:

detecting motion of the at least one object within the images;

calculating motion pixels from the motion; and producing motion density maps from the motion pixels, the motion density map providing the image features; and wherein the means for classifying the image features processes the motion density map with at least one of the classification algorithms to produce object class confidence data.

137. An apparatus for object detection as set forth in claim 136, where the at least one object comprises a vehicle occupant and the area comprises a vehicle occupancy area, and further comprising a means for processing the detected object estimate to provide signals to vehicle systems.

138. An apparatus for object detection as set forth in claim 137, wherein the signals comprise airbag enable and disable signals.

139. An apparatus for object detection as set forth in claim 138, wherein the apparatus further comprises a means for capturing images from a sensor selected from a group consisting of CMOS vision sensors and CCD vision sensors.

140. An apparatus for object detection as set forth in claim 139, wherein at least one of the classification algorithms is selected from the group consisting of a trained C5 decision tree, a trained Nonlinear Discriminant Analysis network, and a trained Fuzzy Aggregation Network.

141. An apparatus for object detection as set forth in claim 127, where the at least one object comprises a vehicle occupant and the area comprises a vehicle occupancy area, and further comprising a means for processing the detected object estimate to provide signals to vehicle systems.

142. An apparatus for object detection as set forth in claim 141, wherein the signals comprise airbag enable and disable signals.

143. An apparatus for object detection as set forth in claim 142, wherein the apparatus further comprises a means for capturing images from a sensor selected from a group consisting of CMOS vision sensors and CCD vision sensors.

144. An apparatus for object detection as set forth in claim 143, wherein at least one of the classification algorithms is selected from the group consisting of a trained C5 decision tree, a trained Nonlinear Discriminant Analysis network, and a trained Fuzzy Aggregation Network.

* * * * *